US012649442B2

(12) United States Patent
May et al.

(10) Patent No.: US 12,649,442 B2
(45) Date of Patent: Jun. 9, 2026

(54) MODULAR WHEEL CLEANING SYSTEM

(71) Applicant: Carl Freudenberg KG, Weinheim (DE)

(72) Inventors: Jordon May, Downers Grove, IL (US); Fred Cecala, Mount Prospect, IL (US)

(73) Assignee: Carl Freudenberg KG, Weinheim (DE)

( * ) Notice: Subject to any disclaimer, the term of this patent is extended or adjusted under 35 U.S.C. 154(b) by 115 days.

(21) Appl. No.: 18/402,322

(22) Filed: Jan. 2, 2024

(65) Prior Publication Data

US 2025/0214543 A1 Jul. 3, 2025

(51) Int. Cl.

| | |
|---|---|
| B60S 3/04 | (2006.01) |
| B08B 1/14 | (2024.01) |
| B08B 1/20 | (2024.01) |
| B08B 3/08 | (2006.01) |
| B08B 13/00 | (2006.01) |
| B32B 5/02 | (2006.01) |

(Continued)

(52) U.S. Cl.
CPC .............. B60S 3/042 (2013.01); B08B 1/143 (2024.01); B08B 1/20 (2024.01); B08B 3/08 (2013.01); B08B 13/00 (2013.01); B32B 5/02 (2013.01); B32B 5/18 (2013.01); B32B 5/245 (2013.01); B32B 27/065 (2013.01); B32B 27/32 (2013.01); B32B 27/34 (2013.01); B32B 2307/546 (2013.01); B32B 2307/726 (2013.01); B32B 2432/00 (2013.01)

(58) Field of Classification Search
CPC .................... B60S 3/041–042; B08B 1/00–32; B08B 1/36
See application file for complete search history.

(56) References Cited

U.S. PATENT DOCUMENTS

| | | | | | |
|---|---|---|---|---|---|
| 3,667,486 | A | * | 6/1972 | Cole ........................ | B60S 3/042 134/45 |
| 4,985,957 | A | * | 1/1991 | Belanger ................. | B60S 3/042 15/53.4 |

(Continued)

FOREIGN PATENT DOCUMENTS

| | | | | | |
|---|---|---|---|---|---|
| CN | 110090829 A | * | 8/2019 | ............. | B08B 13/00 |
| CN | 214929608 U | * | 11/2021 | | |

(Continued)

*Primary Examiner* — Omair Chaudhri
(74) *Attorney, Agent, or Firm* — Leydig, Voit & Mayer, Ltd.

(57) ABSTRACT

A wheel cleaning system includes a bottom, two sidewalls, and multiple gates. The bottom includes: a channel extending in a downstream direction and receives a wheel; an entry ramp disposed at an upstream end of the channel; and an exit ramp disposed at a downstream end of the channel. The sidewalls are disposed on opposite sides of the bottom, each sidewall extending up from the bottom. The gates are disposed in an alternating fashion on opposite sidewalls along the channel with a separation sufficient to avoid interference between gates and configured to rotate over the channel. Each gate includes: a cleaning pad holder; a cleaning pad that fastens to the holder; an attachment plate fastened to a respective sidewall; a hinge pin that rotatably connects the holder to the attachment plate; and a return mechanism that applies a force on the gate to restore the gate to a rest position.

15 Claims, 25 Drawing Sheets

(51) Int. Cl.
    *B32B 5/18*        (2006.01)
    *B32B 5/24*        (2006.01)
    *B32B 27/06*      (2006.01)
    *B32B 27/32*      (2006.01)
    *B32B 27/34*      (2006.01)

(56) References Cited

U.S. PATENT DOCUMENTS

| | | | | |
|---|---|---|---|---|
| 5,309,931 A | * | 5/1994 | Meyer, III | B60S 3/042 |
| | | | | 134/123 |
| 5,991,952 A | * | 11/1999 | Bintzler | B60S 3/006 |
| | | | | 15/53.4 |
| 6,671,917 B2 | * | 1/2004 | Nishina | A61G 5/10 |
| | | | | 15/53.4 |
| 11,465,596 B1 | * | 10/2022 | Cecala | B08B 1/20 |
| 2001/0037765 A1 | * | 11/2001 | Gorra | B60S 3/042 |
| | | | | 118/264 |
| 2018/0326446 A1 | * | 11/2018 | Anderson | B05C 21/00 |

FOREIGN PATENT DOCUMENTS

| | | | | | |
|---|---|---|---|---|---|
| DE | 102015010240 A1 | * | 2/2017 | | B60S 3/042 |
| GB | 2484677 A | * | 4/2012 | | B60S 3/042 |
| KR | 20150126219 A | * | 11/2015 | | B08B 1/34 |
| KR | 102635734 B1 | * | 2/2024 | | A61G 5/10 |

* cited by examiner

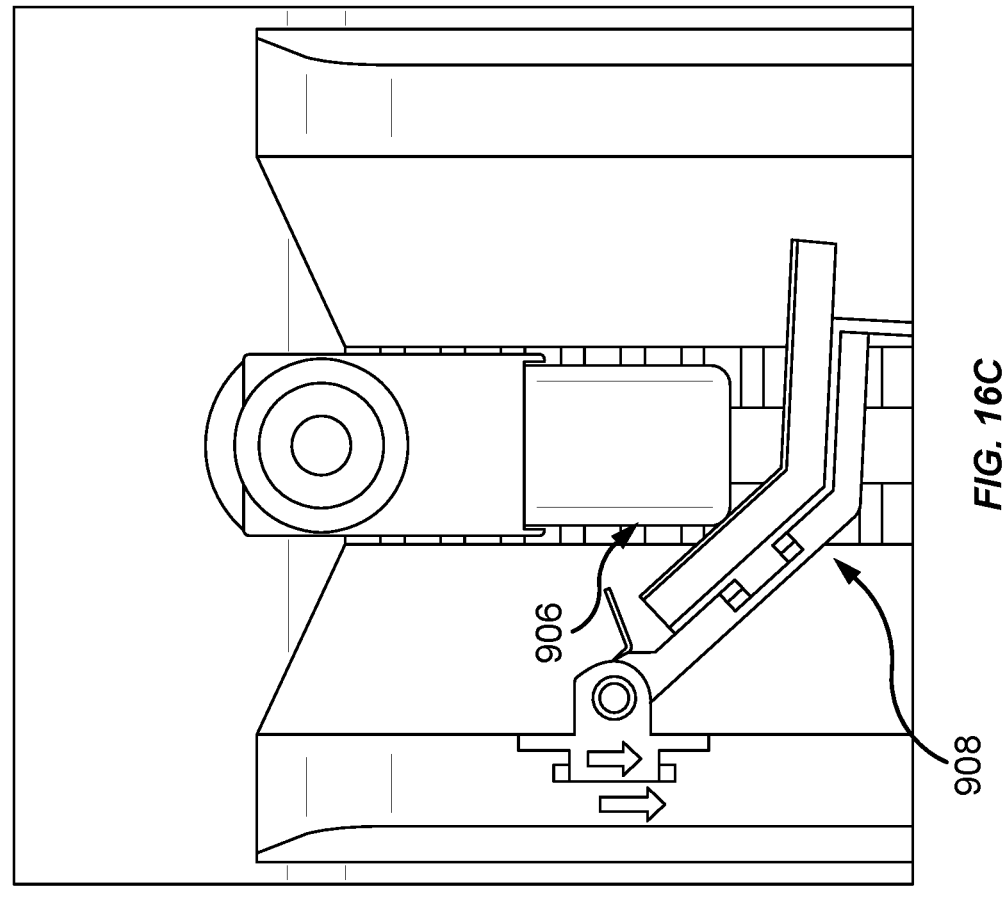
*FIG. 16C*
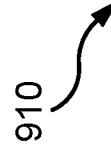

MODULAR WHEEL CLEANING SYSTEM

BACKGROUND

Different operating environments such as clean rooms often have dirt or other contaminants being introduced to them by operators and the tools and equipment operators bring into those environments. More particularly, contaminants may be brought into an environment by the carts and wheeled carriers an operator uses to carry material into the clean room. Conversely, an operator risks bringing substances such as germs or hazardous materials out of an operating environment when carrying materials on carts out of the clean room. In addition, there is a risk of cross-contamination coming from the wheels during movement of equipment in and out of critical environments. There is a need for a wheel cleaning system that helps mitigate this risk. Systems and devices according to the disclosure satisfy this need.

BRIEF SUMMARY

An aspect of the disclosure provides a system for cleaning wheels. The system may include a first module that includes a first bottom, a pair of first sidewalls, and a plurality of gates. The first bottom may include: a first channel extending in a downstream direction and configured to receive a wheel; an entry ramp disposed at an upstream end of the first channel; and a first exit ramp disposed at a downstream end of the first channel. The pair of first sidewalls may be disposed on opposite sides of the first bottom, each sidewall extending up from the first bottom. The plurality of gates may be disposed in an alternating fashion on opposite first sidewalls along the first channel with a separation sufficient to avoid interference between gates and configured to rotate over the first channel. Each gate may include: a cleaning pad holder; a cleaning pad configured to be fastened to the cleaning pad holder; an attachment plate fastened to a respective sidewall; a hinge pin that rotatably connects the cleaning pad holder to the attachment plate; and a return mechanism configured to apply a restoring force on the gate to restore the gate to a rest position when the gate is displaced from the rest position.

Another aspect of the disclosure provides a pad for cleaning wheels. The pad may include: a rigid backing configured to fasten to a cleaning pad holder; an absorbent and elastically deformable material comprising a front surface and a back surface and configured to hold cleaning chemicals, the back surface of the absorbent material fastened to the rigid backing; and a covering material disposed on the front surface of the absorbent material and configured to collect particulate material.

BRIEF DESCRIPTION OF THE DRAWINGS

FIGS. 16A-16C present a series of top views of a wheel passing by a gate in accordance with the disclosure.

DETAILED DESCRIPTION

In one or more aspects, the disclosed modular wheel cleaning system is a mechanical cleaning tool that is modular and movable. As a wheel presses into a cleaning pad mounted on a gate, the compression of an absorbent and elastically deformable material in the pad is used to deform around the wheel/castor surface allowing full contact of the cleaning pad with the wheel. The gate uses rotating hinges with removable and replaceable cleaning pads to scrape the wheel/castor surface, thus cleaning as the wheels/castors pass by. Multiple gates may be placed in-line with a center track (or channel) to guide the wheel through the cleaning system. Each gate may be removable for ease of replacement, storage, and cleaning.

Figure 1:
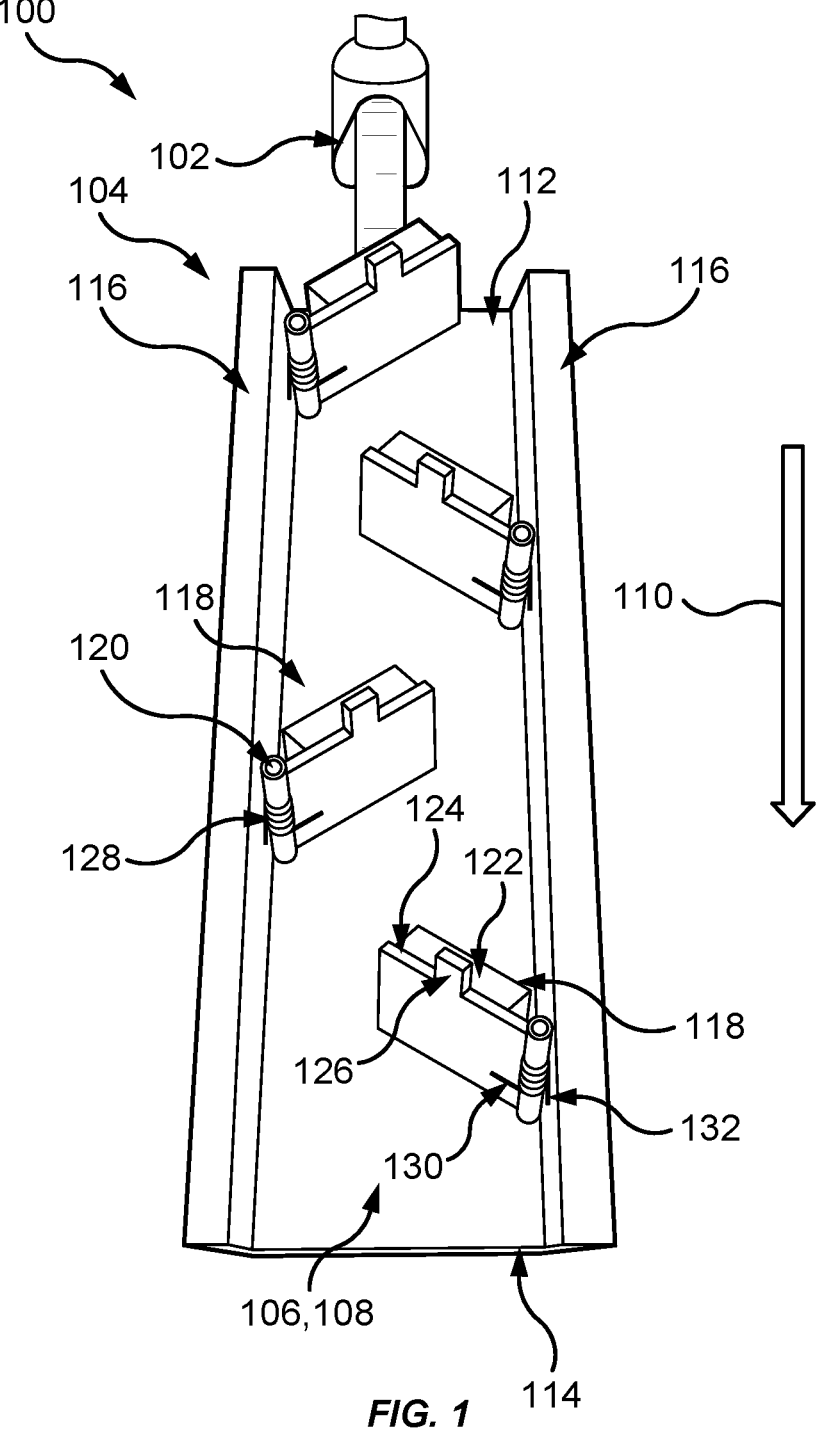
FIG. 1 provides a perspective view of one embodiment of a system for cleaning wheels in accordance with the disclosure.

FIG. 1 presents a perspective view of an embodiment of a system 100 for cleaning wheels 102. The system 100 of the present embodiment may include a module 104. The module 104 may include a bottom 106 that defines a channel 108 extending in a downstream direction 110 from an upstream end 112, or entry end, of the channel 108 to a downstream end 114, or exit end, of the channel 108. The wheel 102 enters the system 100 at the upstream end 112 of the channel 108, rolling along the bottom 106, and exiting the downstream end 114 of the channel 108.

The module 104 may also include a pair of sidewalls 116 on opposite sides of the bottom 106 and extending up from the bottom 106. These sidewalls 116 may be vertical in direction, running essentially perpendicular to the bottom 106 and the surface on which the module 104 sits. For example, the module 104 may sit on a floor or on a covering of a floor.

The bottom 106 and the pair of sidewalls 116 may be formed from and comprise a single piece.

The module 104 may also include a plurality of gates 118. Each gate 118 may be attached to one sidewall of the pair of sidewalls 116. The gates 118 may be arranged in an alternating fashion on opposite sidewalls 116 with a separation between the gates 118 sufficient to avoid interference between gates 118. Each gate 118 may be attached to a sidewall 116. Each gate 118 may be configured to rotate over the channel 108 about a hinge pin 120.

Still referring to FIG. 1, each gate 118 may include a cleaning pad 122 that is configured to contact a wheel 102 as the wheel 102 proceeds downstream along the channel 108 in order to clean the wheel 102. A back surface 124 of the cleaning pad 122 may be fastened to a cleaning pad holder 126. The cleaning pad holder 126 may be made of a rigid material and rotatably attached at one side edge to a sidewall 116 by the hinge pin 120. The rigid material of the cleaning pad holder 126 may be plastic, metal, composite material, or other suitable material. For example, the cleaning pad holder 126 may be steel, stainless steel, aluminum, titanium, platinum, a metal alloy, or other metal. The cleaning pad holder may also be polypropylene, polyvinyl chloride (PVC), polycarbonate, polyethylene, high density polyethylene (HDPE), nylon, or other plastic material. The material of the cleaning pad holder 126 may be impermeable to liquids and/or nonporous. The cleaning pad holder 126 may be planar without overall curvature or bend. The cleaning pad will be discussed in greater detail below.

Each gate 118 may also include a return mechanism. As seen in the embodiment shown in FIG. 1, the return mechanism may be a return spring 128. The return spring 128 may be wound around the hinge pin 120. The return spring 128 may include a first arm 130 that may be operably connected to the cleaning pad holder 126 and a second arm 132 operably connected to the respective sidewall 116. In one or more other embodiments, a return spring 128 may not include a coil wound around the hinge pin 120, but simply include a first arm 130 and a second arm 132.

Figure 2:
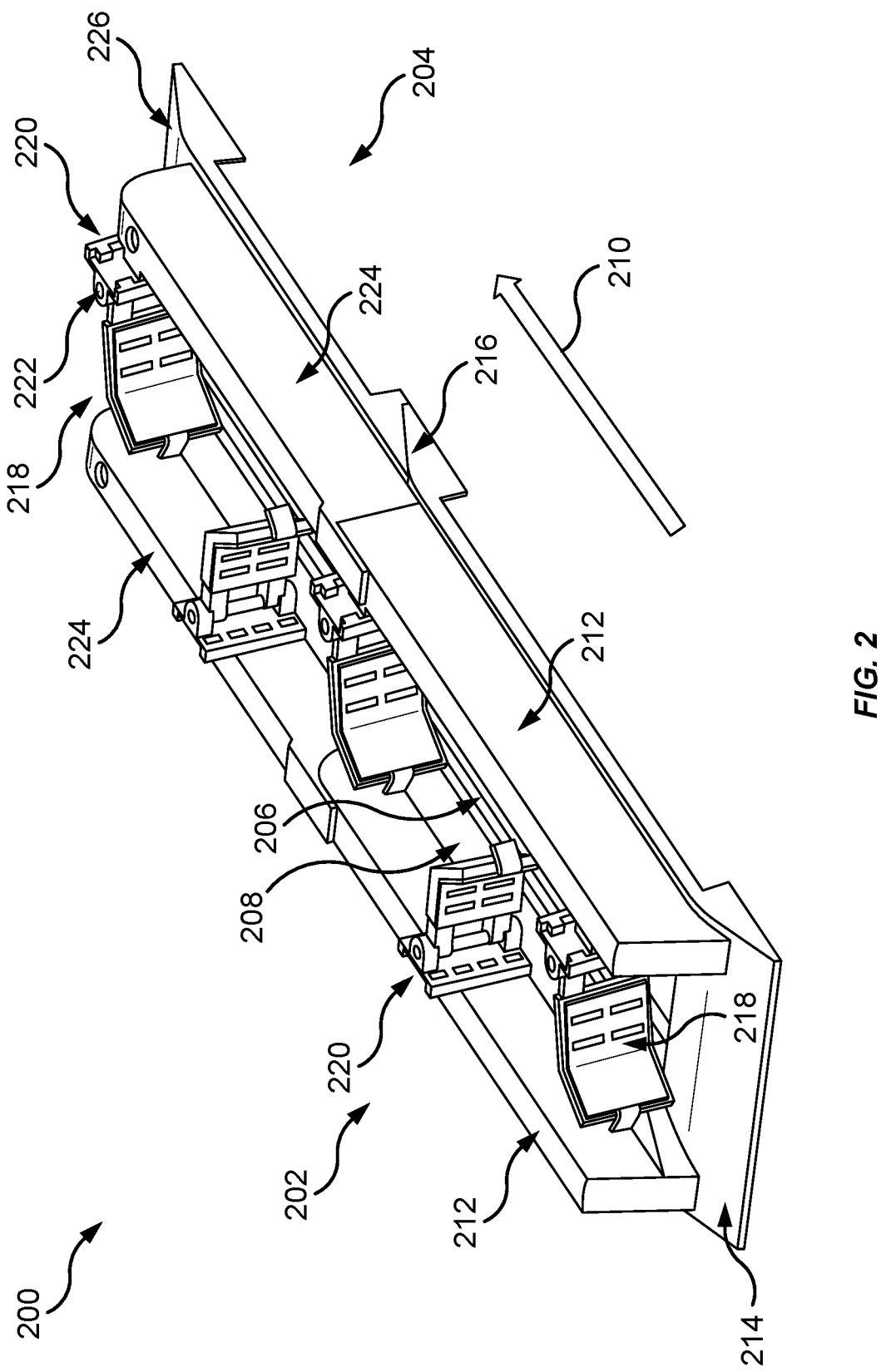
FIG. 2 provides a perspective view of a second embodiment of a system for cleaning wheels in accordance with the disclosure.

A second embodiment of a system 200 for cleaning wheels is presented in FIG. 2. Parts described above with regard to FIG. 1 will not be described again unless additional or different properties apply in the second embodiment.

System 200 may include a first module 202 and at least one extension module 204. Additional extension modules 204 may be added to the system 200 as desired by the user. The first module 202 and any extension module 204 may comprise one or more of plastic, composite material, or metal. Exemplary, but non-limiting plastics include polypropylene, polyvinyl chloride (PVC), polycarbonate, polyethylene, high density polyethylene (HDPE), nylon, or other plastic material. Exemplary, but non-limiting, metals include steel, stainless steel, aluminum, titanium, platinum, a metal alloy, or other metal.

The first module 202 may include a first bottom. The first bottom may include a first channel 206 and a pair of first shoulders 208 that bound the first channel 206 on either side. The first channel 206 may extend in a downstream direction 210 and be configured to receive and guide a wheel in the downstream direction 210 for cleaning. The first bottom may also include an entry ramp 214 and a first exit ramp 216 (seen more clearly in other figures). The entry ramp 214 may be disposed at an upstream end of the first channel 206 and may receive the wheel to be cleaned. The first exit ramp 216 may be disposed at a downstream end of the first channel 206. The first module 202 may include a first pair of sidewalls 212 disposed at either side of the first bottom. More specifically, the first sidewalls 212 may be located to the outside of the first shoulders 208 and extend upward from the first bottom. The first shoulders 208 may be vertical. The first bottom, including the first channel 206 and the first shoulders 208, and the first sidewalls 212 may be formed of one piece.

Still referring to FIG. 2, the first module 202 may include a plurality of gates 218 disposed in an alternating fashion on opposite sidewalls 212 along the first channel 206 with a separation sufficient to avoid interference between gates 218. The gates 218 may be configured to rotate over the first channel 206. In one or more embodiments, the first module 202 may include three gates 218. Each gate 218 may include a cleaning pad holder (the portion of the gate 218 that is showing), a cleaning pad (shown later), an attachment plate 220, a hinge pin 222, and a return mechanism (shown later). The cleaning pad holder may comprise rigid material such as metal or plastic. The cleaning pad may be configured to be fastened to the cleaning pad holder. The attachment plate 220 may be fastened to a respective sidewall 212. For example, the attachment plate 220 may form a mechanical interlock with appropriately shaped portions of the respective sidewall 212. The hinge pin 222 may rotatably connect the cleaning pad holder to the attachment plate 220.

As shown in FIG. 2, each extension module 204 may be configured to extend the system 200 by mating with the downstream end of a previous module. The previous module may include either the first module 202 or another extension module 204. Each extension module 204 may include an extension bottom configured to continue the first bottom without a difference in cross-sectional profile. Each extension module 204 may also include a pair of extension sidewalls 224 configured to continue the pair of first sidewalls 212 without difference in cross-sectional profile. Each extension module 204 may include an extension exit ramp 226 of the same form as the first exit ramp 216. Each extension module 204 may include a rampless upstream end that complements the exit ramp of the previous module such that a continuous channel is formed by the system 200. That is, the rampless upstream end may complement a first exit ramp 216 or an extension exit ramp 226. Each extension module 204 may also include at least one gate 218 of the plurality of gates. For example, the extension module may include two gates 218. The gates 218 of an extension module 204 continue the alternating pattern established in the first module 202.

Figure 3:
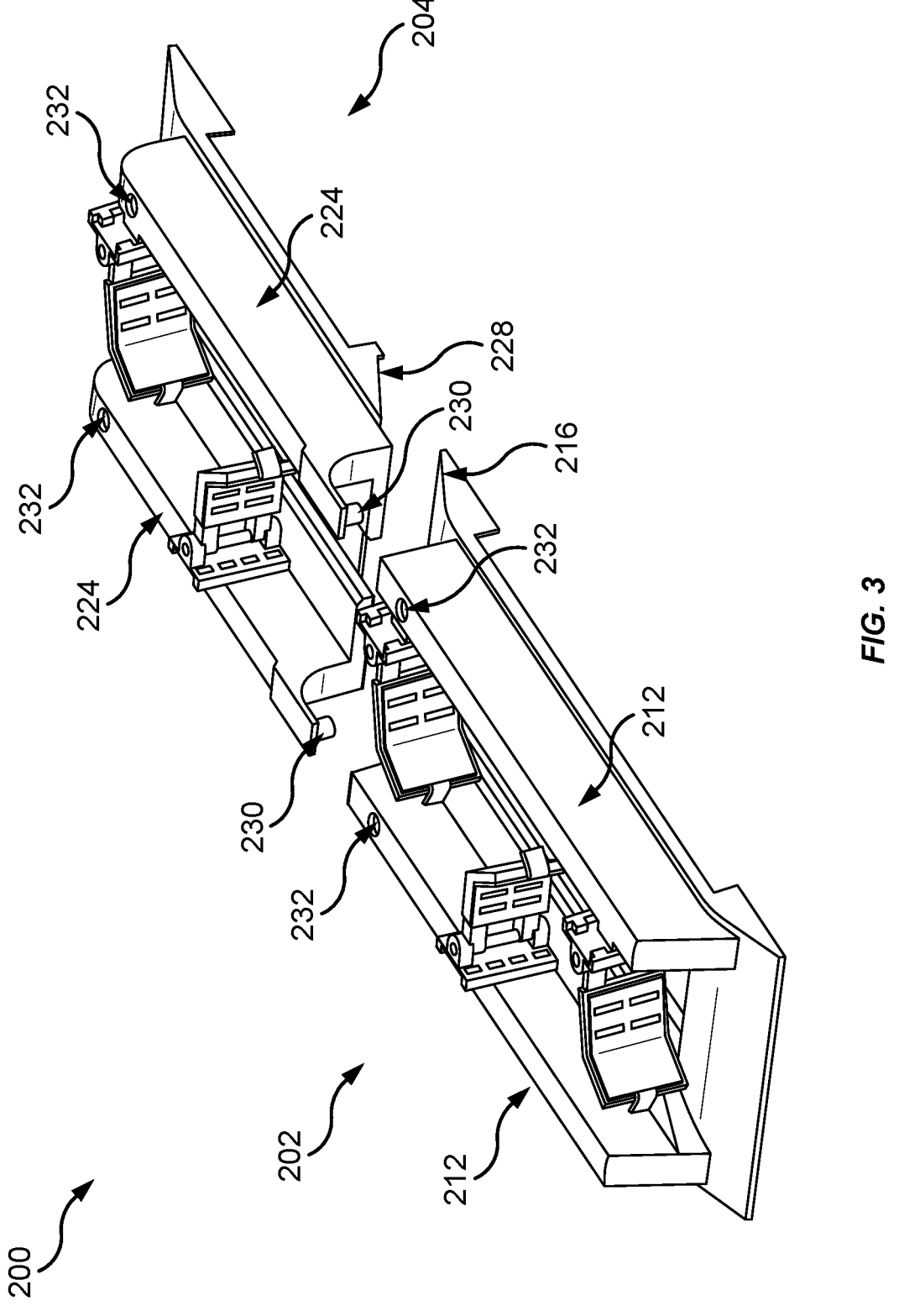
FIG. 3 provides a perspective view of the second embodiment of a system for cleaning wheels showing two modules separated in accordance with the disclosure.

FIG. 3 presents an exploded view of system 200 shown in FIG. 2. The first exit ramp 216 may be seen more clearly as well as the rampless upstream end 228 of the extension module 204. Various means of mating a first module 202 to an extension module 204 or mating two extension modules 204 may be used. In FIG. 3, a pin 230 at the rampless upstream end 228 extending from each extension sidewall 224 fits securely into either a matching hole 232 in a first sidewall 212 or a matching hole 232 in an extension sidewall 224. The mating may occur by other forms of interlocking pieces, pairs of nuts and bolts, screws, adhesive, and other forms of fastening.

Figure 4:
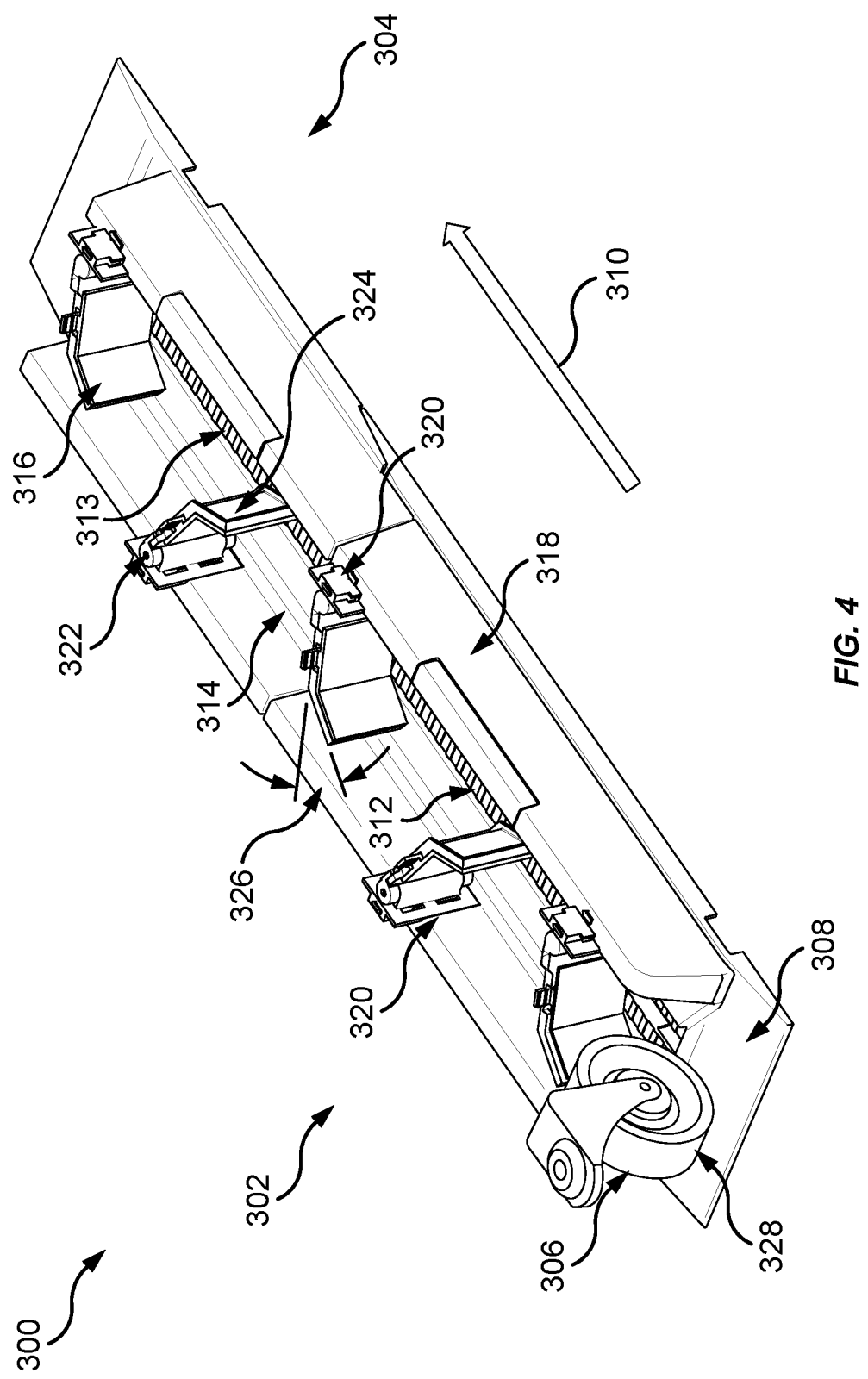
FIG. 4 provides a perspective view of the third embodiment of a system for cleaning wheels with a representative wheel in accordance with the disclosure.

FIG. 4 presents a perspective view of another embodiment of a system 300 for cleaning wheels. This embodiment of the system 300 includes a first module 302 and an extension module 304. A representative wheel 306 to be cleaned is shown on the entry ramp 308 at the upstream end (downstream direction 310 shown) of the system 300.

FIG. 4 provides a clearer view of the channel 312 along which the wheel 306 passes as well as one of the two elevated shoulders 314 that border the channel 312 on either side. The surface of the channel 312 along which the wheel 306 may pass may include treads 313 to ensure that the wheel 306 rolls along the channel as opposed to moving without rotating, that is, sliding. The treads 313 may cover all or a portion of the channel 312. The surface of the channel 312 may be roughened in other manners to provide the same effect.

Looking at the gates 316, one may observe that each gate 316 is attached to a respective sidewall 318 by an attachment plate 320. A hinge pin 322 rotatably connects the attachment plate 320 to the cleaning pad holder 324, which is configured to hold a replaceable cleaning pad (shown in greater detail later). Each gate 316 may extend over at least one shoulder 314 and may reach entirely across the channel 312. When a wheel 306 is not in contact with a gate 316, the gate 316 may in a rest position as shown in FIG. 4. A return mechanism, for example, a return spring, may provide a force capable of returning a gate 316 to a rest position after a wheel 306 has passed by.

A bend angle 326 formed by the bend in the cleaning pad holder 324 is an acute angle, that is, between 0° and 90°. The cleaning of a wheel may be improved when the bend angle is between 30° and 60°. The bend angle 326 may be 45°. With a bend angle of 45°, for example, the outer portion of the gate 316, containing the absorbent and elastically deformable material, first fully engages the front surface of the wheel 306. Such a bend may allow the wheel 306 to be cleaned more effectively on the rolling surface 328 of the wheel 306 as well as the side of the wheel 306. In one or more embodiments, the bend may extend over a larger portion of the cleaning pad holder, rather than the more localized bend angle shown in, for example, FIG. 4.

Figure 5:
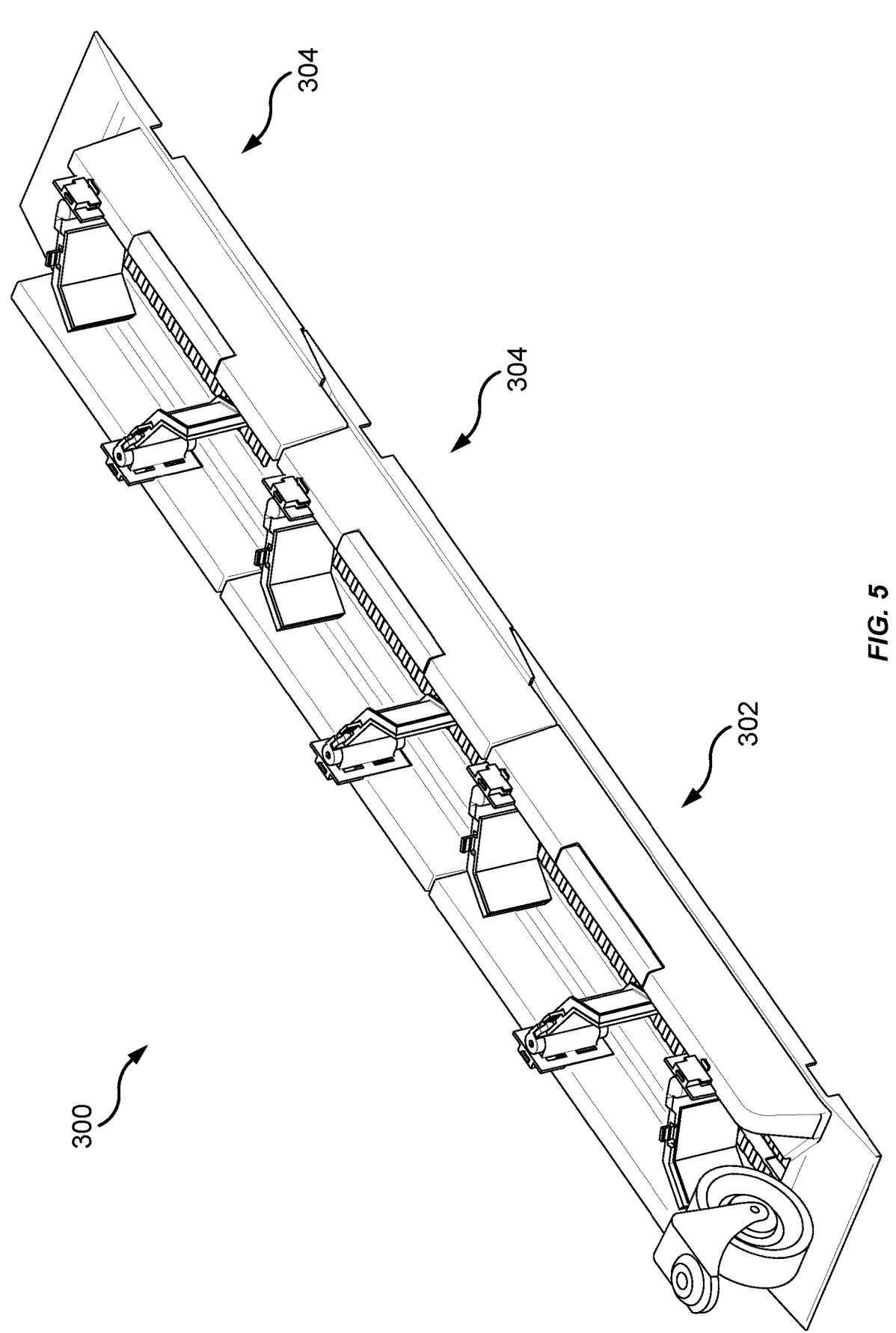
FIG. 5 provides a perspective view of a third embodiment of a system for cleaning wheels that includes three modules in accordance with the disclosure.
Figure 6:
FIG. 6 provides a perspective view of the third embodiment of a system for cleaning wheels showing three modules separated in accordance with the disclosure.

FIG. 5 presents an alternate embodiment of system 300 depicted in FIG. 4. In FIG. 5, a first module 302 and an extension module 304 are extended and supplemented by an additional extension module 304. The modularity of the systems presented in this disclosure allow users to easily provide wheel cleaning appropriate to the operating environment and the needs of the user. The systems of FIGS. 4 and 5 may allow modules to link by a means other than the pin-in-hole method illustrated in FIGS. 2 and 3. FIG. 6 provides an exploded perspective view of the three modules that make up the embodiment illustrated in FIG. 5. Interlocking parts may be used to attach extension modules in the system.

Another embodiment of the present disclosure is illustrated in FIGS. 7A-7D. This embodiment shares features of one or more previously described embodiments. Description of such features may not be repeated here.

Figure 7A:
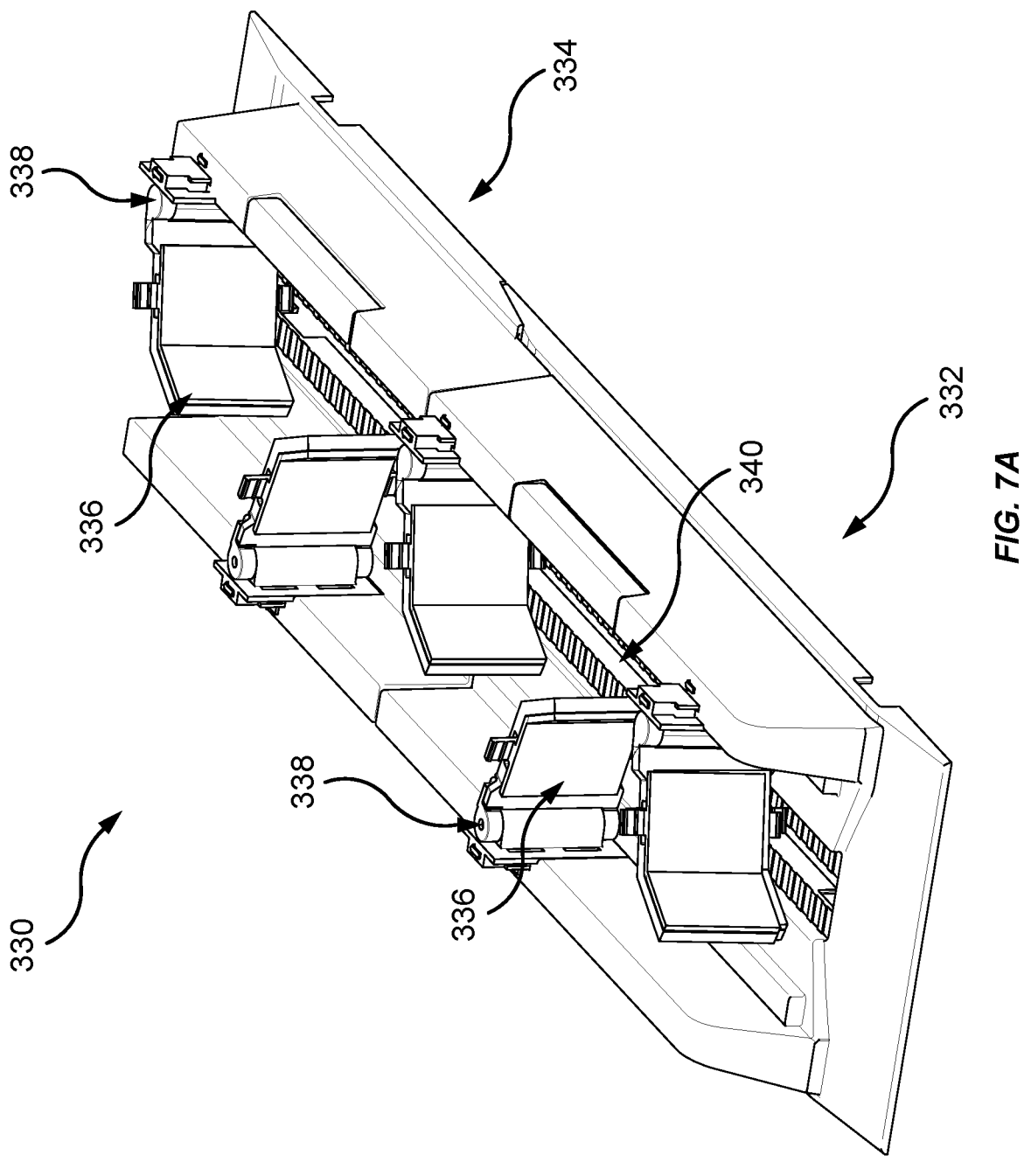
FIGS. 7A-7D provide perspective views of the fourth embodiment of a system for cleaning wheels showing three modules separated in accordance with the disclosure.

Referring to FIG. 7A, wheel cleaning system 330 includes a first module 332 and an extension module 334. Additional extension modules 334 may be added to the wheel cleaning system 330. The system 330 includes a plurality of gates 336. The first module may include three gates 336 and extensions modules may include two gates 336. Gates 336 throughout the system 330 alternate from the location of the hinge pin 338 about which a gate 336 may rotate from one side of a channel 340 to an opposite side of the channel 340.

Figure 7B:
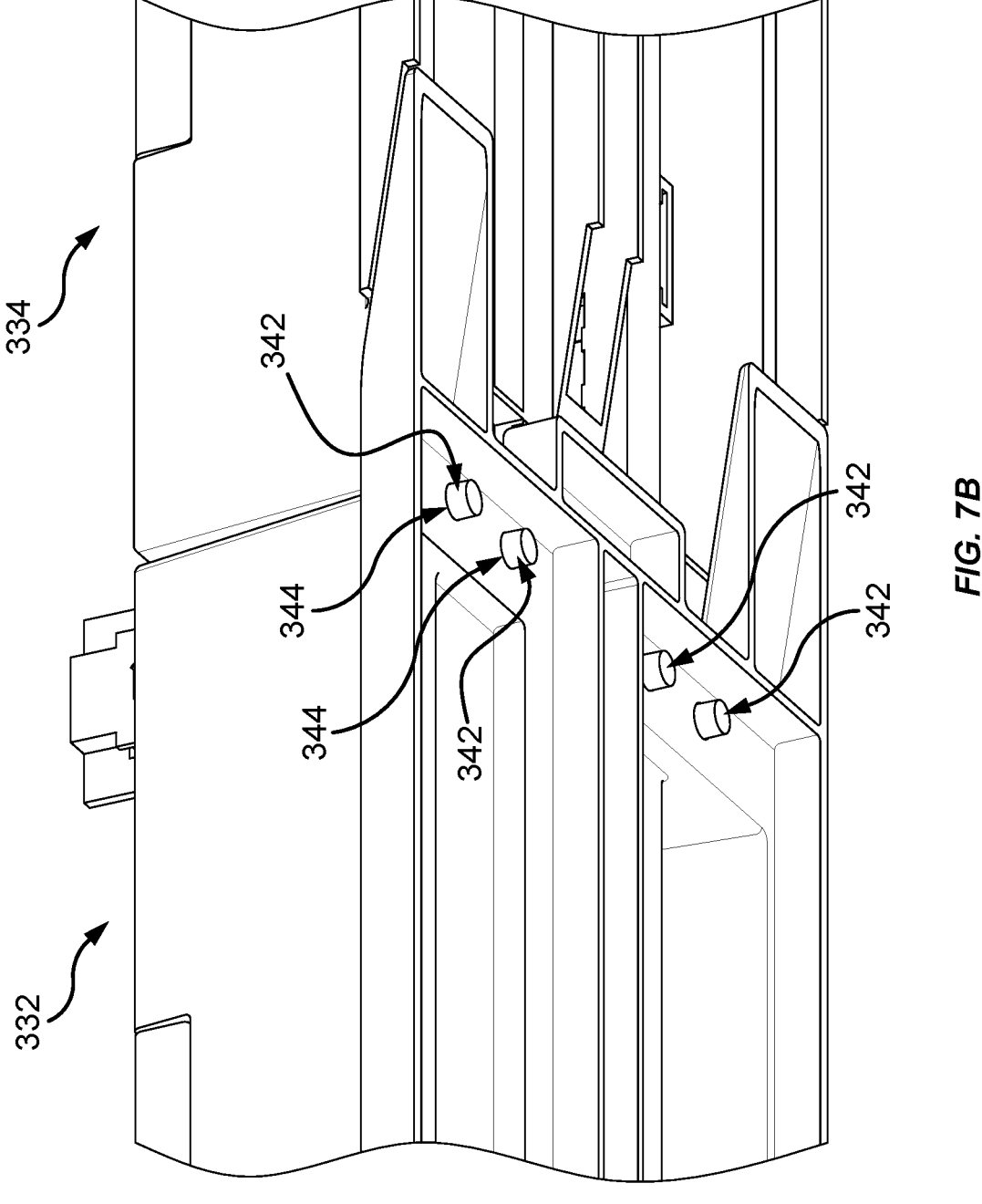

FIG. 7B provides an underside view of the wheel cleaning system 330 from FIG. 7B. Extension module 334 is shown connecting to first module 332. Extension module 334 may include a plurality of pins 342 that are configured to fit into holes 344 in the first module. Although not shown in FIG. 7B, the far end of the extension module 334 has a plurality of holes identical with those shown in first module 332 to be used to connect to an additional extension module 334.

Figure 7C:
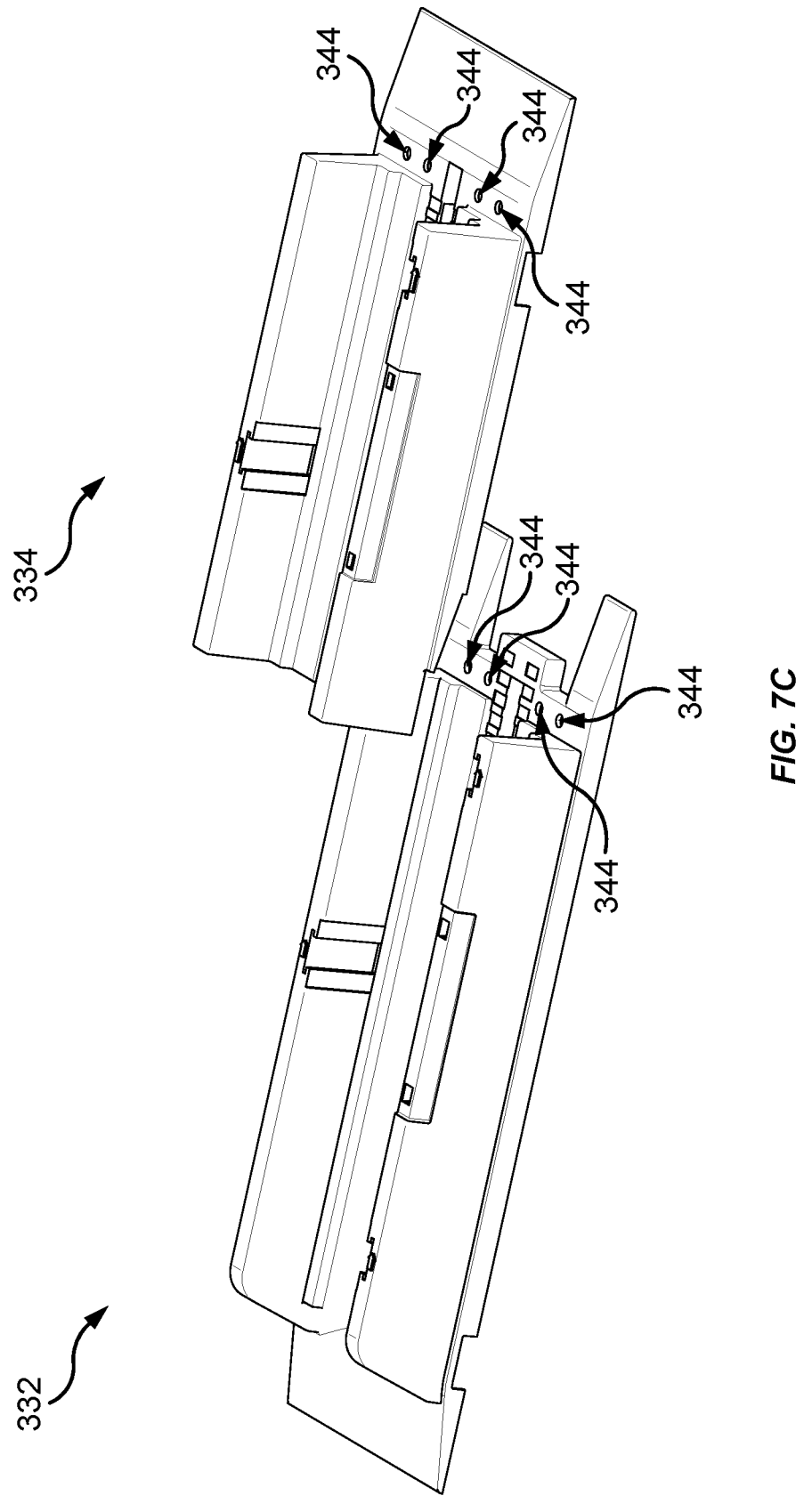

FIG. 7C presents the wheel cleaning system 330 of FIGS. 7A and 7B. Holes 344 in first module 332 may be configured to receive complementary pins 342 from extension module 334. Extension module 344 also includes holes 344 at the end distal from the first module 332 to allow another extension module 344 to be added to the system 330.

Figure 7D:
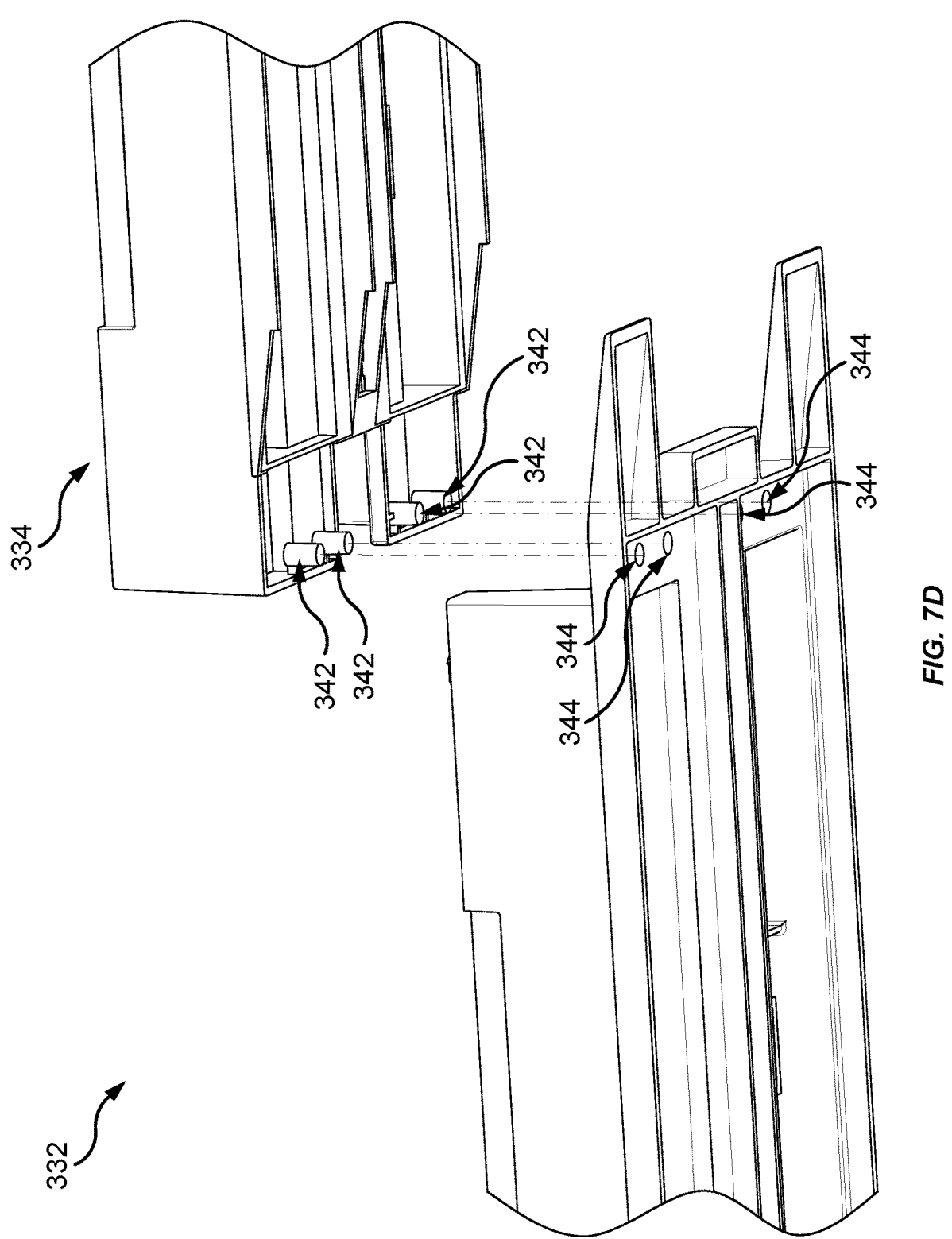

FIG. 7D presents an underside view of the wheel cleaning system 330 showing extension module 334 with pins 342 configured to fit into respective holes 344 of first module 332 allowing the extension module 334 to be securely attached to the first module 332.

Modules, either first module and extension modules or two extension modules, may be joined by various other means not illustrated by drawings. For example, modules may be connected by bolts (including plastic, metal, or the like), snap fit, clip ons, interference fit or other methods known in the art.

The modular wheel cleaning systems described herein may also include ways to identify with which system a module is associated. Modules may be separated during cleaning or one system may be associated with a first clean room or environment while another system may be associated with a second clean room. In order to keep modules that are part of the same system together and ensure each system is placed in the proper location, the present disclosure provides means for properly associating modules.

Figure 8:
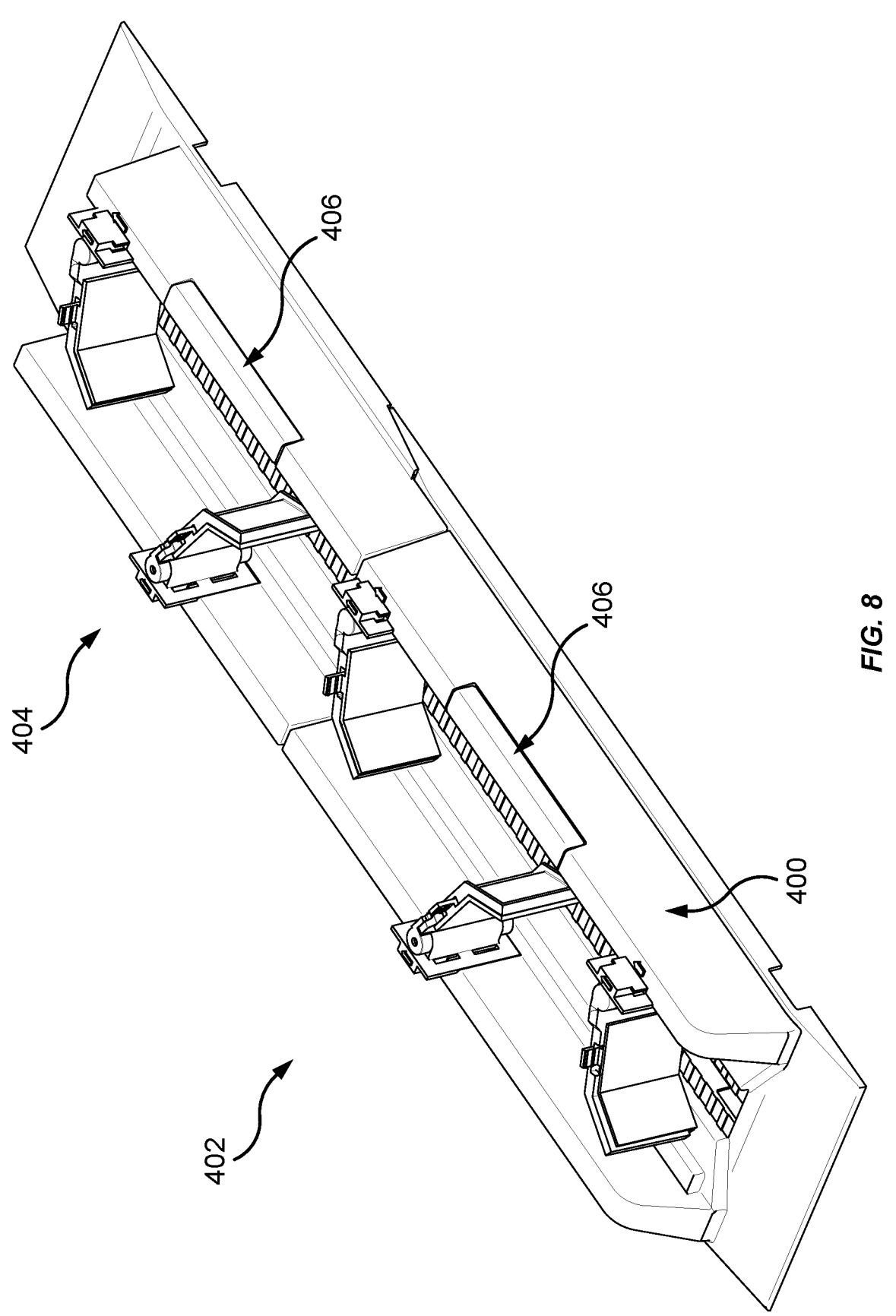
FIG. 8 provides a perspective view of an embodiment of a system for cleaning wheels showing identifiers in accordance with the disclosure.

Referring to FIG. 8, at least one sidewall 400 of each first module 402 and extension module 404 may include an identifier 406. The identifier 406 may be attached to the sidewall 400 by snapping on, which may allow the identifier 406 to be removed from the sidewall 400 in the future. The identifier 406 may also be attached by other means, for example, adhesive, hook and loop fastener, fusing, welding, and other similar means.

The identifier 406 may distinguish modules of one system from modules of a second system using a color, one or more alphanumeric characters, one or more nonfunctional shapes, or a combination of these ways of identifying. Examples of nonfunctional shapes include geometric shapes like circles, triangles, squares, and the like as well as non-geometric shapes like stars, waves, and the like.

Figure 9:
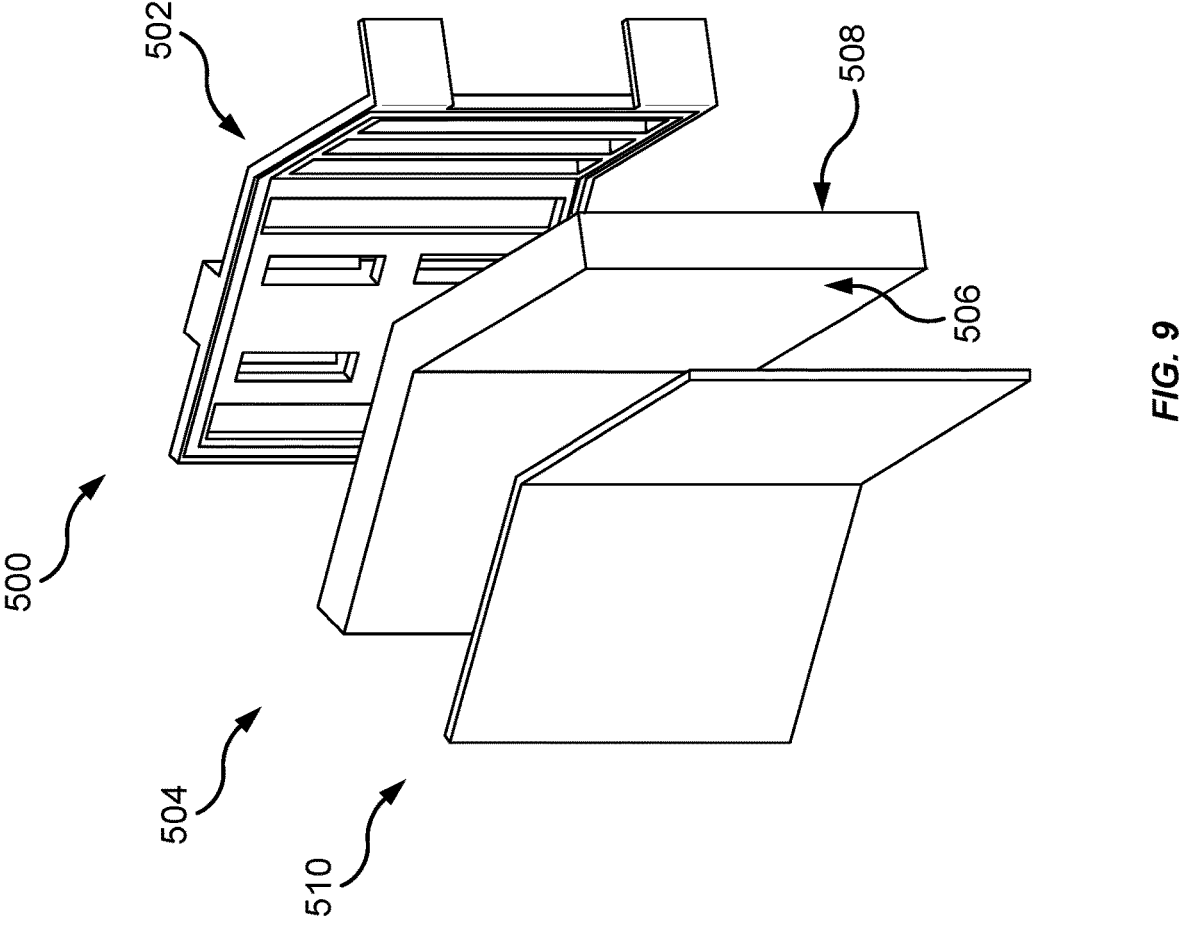
FIG. 9 provides an exploded perspective view of a cleaning pad of a system for cleaning wheels in accordance with the disclosure.

FIG. 9 provides an exploded perspective view of a cleaning pad 500 that may be incorporated into one or more of the modular wheel cleaning systems described herein. The cleaning pad 500 may be replaceable, allowing fresh cleaning pads to be used in the modular wheel cleaning systems as needed and/or required by the user or by facility, industry, or government regulation. The cleaning pad 500 may include a rigid backing 502. The rigid backing 502 may be attached to and removed from a cleaning pad holder as described herein. The rigid backing may include polypropylene, nylon, or other rigid material. The rigid backing 502 of the cleaning pad 500 may include a bend or curve that conforms to that of a cleaning pad holder.

The cleaning pad 500 may include an absorbent and elastically deformable material 504. The absorbent material 504 may include a foam material. The absorbent material 504 may include a front surface 506 and a back surface 508. The absorbent material 504 may be in the shape of a rectangular solid, though it may include a bend to conform the cleaning pad 500 to an associated cleaning pad holder. The absorbent material 504 may be configured to hold liquids such a water, cleaning chemicals, and the like. The back surface 508 of the absorbent material is configured to fasten to the rigid backing 502.

The cleaning pad 500 may also include a covering material 510. The covering material 510 may be disposed on the front surface 506 of the absorbent material 504 and may be configured to collect particulate material. Particulate material may include dirt, bacteria, viruses, fungi, and other potential contaminants. The covering material 510 may be cloth-like. The covering material 510 may be a microfiber material. The covering material 510 may be laminated to the front surface 506 of the absorbent material 504.

Figure 10:
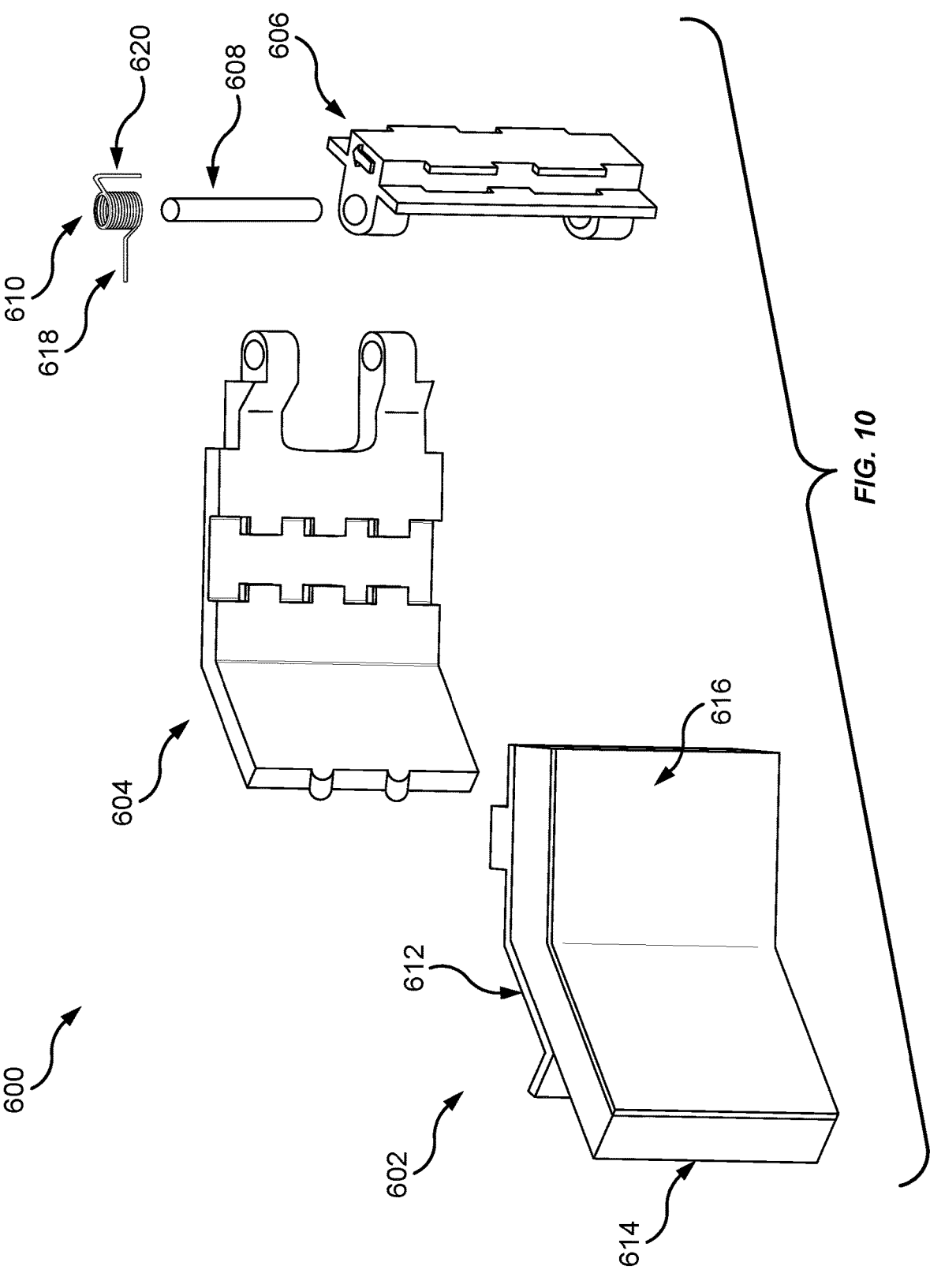
FIG. 10 provides an exploded perspective view of a gate of a system for cleaning wheels in accordance with the disclosure.

An exploded view of a gate 600 according to one or more embodiments of the present disclosure is depicted in FIG. 10. The gate 600 may include a cleaning pad 602, a cleaning pad holder 604, an attachment plate 606, a hinge pin 608, and a return mechanism. In the illustrated embodiment of FIG. 10, the return mechanism may be a return spring 610. The gate 600 may have a bend or curvature. The bend or curvature may allow the gate 600 to make better and/or longer contact with a wheel to be cleaned, thus providing better, more complete cleaning of the wheel.

The cleaning pad 602 may include a rigid backing 612, an absorbent and elastically deformable material 614, and a covering material 616. The cleaning pad 602 may be replaceable.

The rigid backing 612 may attach mechanically, such as a snap fit, by interlocking, by sliding, and/or with complementary features, to a cleaning pad holder 604. Other means of attaching (fixing, fastening) the rigid backing 612 to the cleaning pad holder 604 may also be used. These means of attaching include adhesive, hook and loop fastener, nuts and bolts, screws, and the like.

The cleaning pad holder 604 may be configured to releasably fasten to a cleaning pad 602 via the rigid backing 612 of the cleaning pad 602. The cleaning pad holder 604 may be configured to receive a hinge pin 608, about which the cleaning pad holder 604 may be configured to rotate along with the cleaning pad 602. An attachment plate 606 may be configured to attach to a sidewall by interlocking parts, sliding, snap fit, complementary features, and the like. The attachment plate 606 may be configured to receive the hinge pin 608. Thus, the gate 600 may be rotatably fastened to a sidewall via the hinge pin 608 and the attachment plate 606.

As a wheel passes by a gate 600, the gate 600 may be displaced from a rest position. After the wheel passes the gate 600, it may be useful to return the gate 600 to a rest position in preparation for receiving and cleaning another wheel. The gate may be returned by means of a return mechanism. One example of a return mechanism illustrated in FIG. 10 is a return spring 610. The return spring 610 may include a first arm 618 operably connected to the cleaning pad holder 604 and a second arm 620 operably connected to the attachment plate 606. When the gate 600 is rotated away from a rest position, the return spring 610 may apply a force on the gate 610 to return the gate 610 to a rest position.

As a gate returns to a rest position, there may be a possibility of a rapid deceleration of the gate that may cause debris, dirt, bacterial, fungal, and/or viral matter to be dislodged from the cleaning pad on the gate and dispersed in a manner that may lead to contamination. To decrease the likelihood of such an event, a damping mechanism may be included with a gate to avoid abrupt deceleration.

Figure 11:
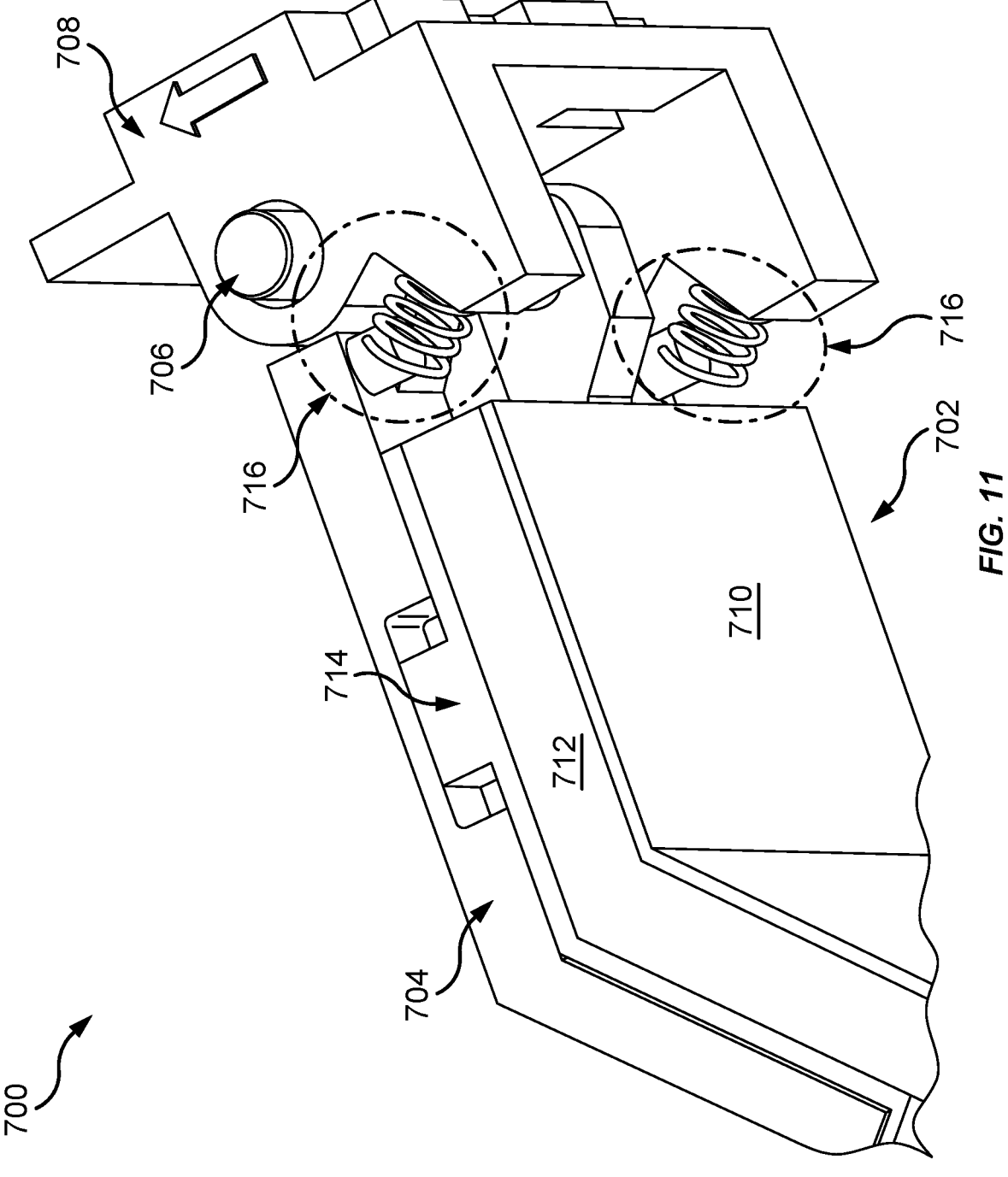
FIG. 11 provides a perspective view of damping mechanisms for a gate of a system for cleaning wheels in accordance with the disclosure.

Referring to FIG. 11, a gate 700 may include a cleaning pad 702, a cleaning pad holder 704, a hinge pin 706, and an attachment plate 708. The cleaning pad 702 may include a covering material 710. The covering material 710 may be a microfiber material. The cleaning pad 702 may also include an absorbent and elastically deformable material 712, for example, a foam material, that may be configured to hold liquids such as water, cleaning chemicals, and the like. The covering material 710 may be laminated to a front surface of the absorbent material 712, while the back surface of the absorbent material 712 may be fastened to a rigid backing 714 of the cleaning pad 702. The rigid backing 714 may be removably attached to the cleaning pad holder 704, for example, by sliding, snap fitting, and the like.

The rotatable portion of the gate 700, specifically, the cleaning pad 702 and the cleaning pad holder 704 may be rotatably fixed to a sidewall via a hinge pin 706 that connects the cleaning pad holder 704 to the attachment plate 708.

The gate 700 may include at least one damping spring 716. Each damping spring 716 may be disposed between the attachment plate 708 and the cleaning pad holder 704. Each damping spring may apply a retarding, or decelerating, force to only a final portion of the return of the gate 700 to a rest position. This limited range of force may be produced by not allowing a damping spring 704 to be in contact with both the attachment plate 708 and the cleaning pad holder 704 at the same time until the final portion of the return is reached. While a damping spring 716 is not being compressed, the damping spring 716 may be attached to just one or the other of the attachment plate 708 and the cleaning pad holder 704. The attachment plate 708 may include a hollowed area sufficient to hold a damping spring 716 in place. The hollowed area, may be, for example, cylindrical to hold a coiled spring. The cleaning pad holder 704 may include a post for each damping spring 716 to fit inside a coil of the damping spring 716 to keep the damping spring 716 in position relative to the cleaning pad holder 704.

Figure 12:
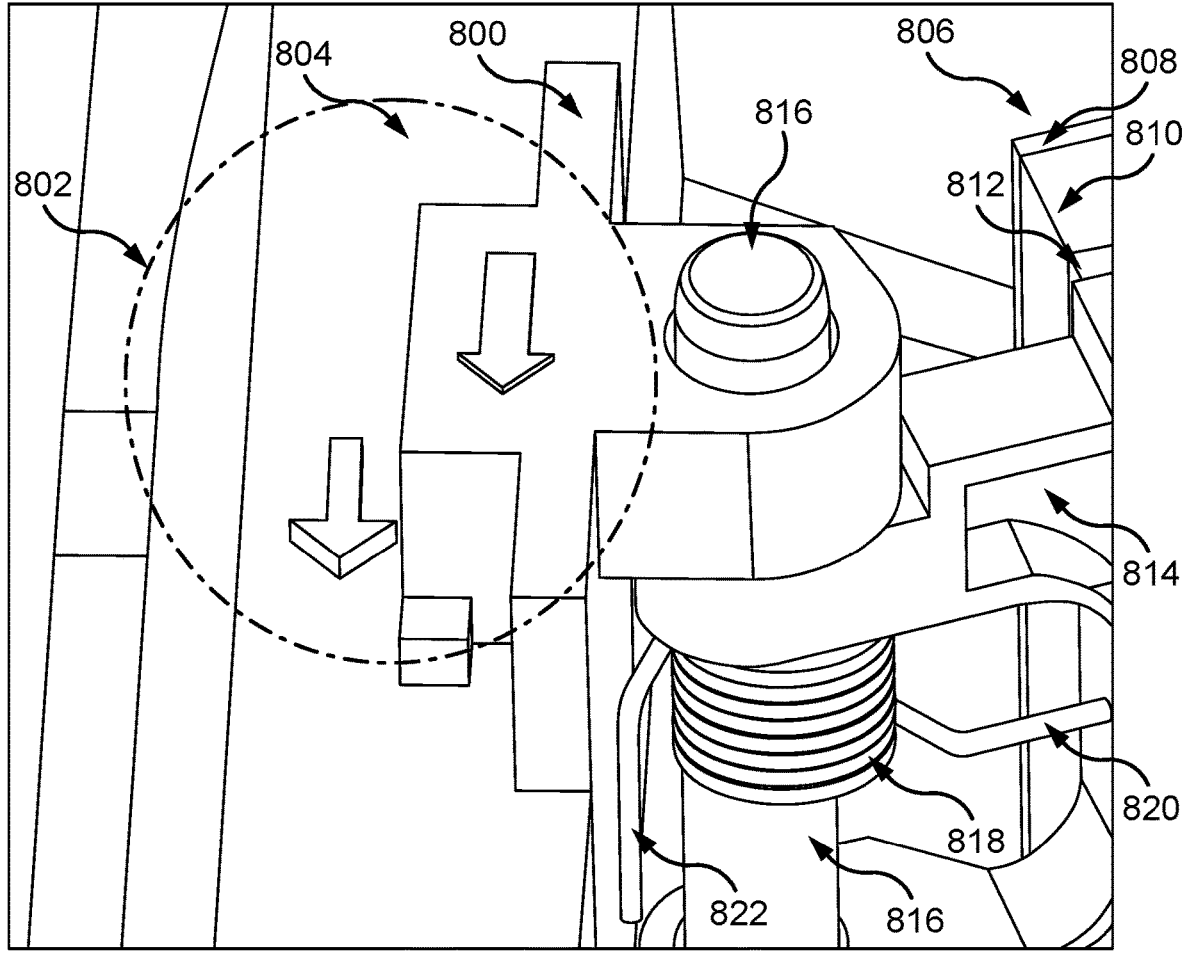
FIG. 12 provides an enlarged view of a portion of a system for cleaning wheels in accordance with the disclosure.

FIG. 12 presents an enlarged view of the area around an attachment plate 800 in a system for cleaning wheels. To help facilitate proper assembly and reassembly of components of the system, markings may be useful. The markings may be molded into, etched into, or otherwise permanently applied to various system components. For example, arrows 802 indicating the downstream direction, that is, the direction of wheel movement through the system, may be molded into the attachment plate 800 and a sidewall 804 to which the attachment plate 800 is fastened. These arrows 802 ensure that the gate 806 is oriented in the correct direction.

Additionally, FIG. 12 provides an enlarged and different perspective on some components of a system for cleaning wheels. Gate 806 may include a cleaning pad with a covering material 808 attached to a front surface of an absorbent and elastically deformable material 810. The back surface of the absorbent material 810 may be fastened to the rigid backing 812 of the cleaning pad. The rigid backing 812 back be removably fastened to the cleaning pad holder 814. The cleaning pad holder 814 may be rotatably attached to the sidewall 804 via the attachment plate 800 through a hinge pin 816. A return spring 818 may be disposed around the hinge pin 816. A first arm 820 of the return spring 818 may extend out from the coil of the return spring 818 and may operably connected to the cleaning pad holder 814. A second arm 822 of the return spring 818 may be operably connected to the attachment plate 800.

Figures 13A, 13B, 13C:
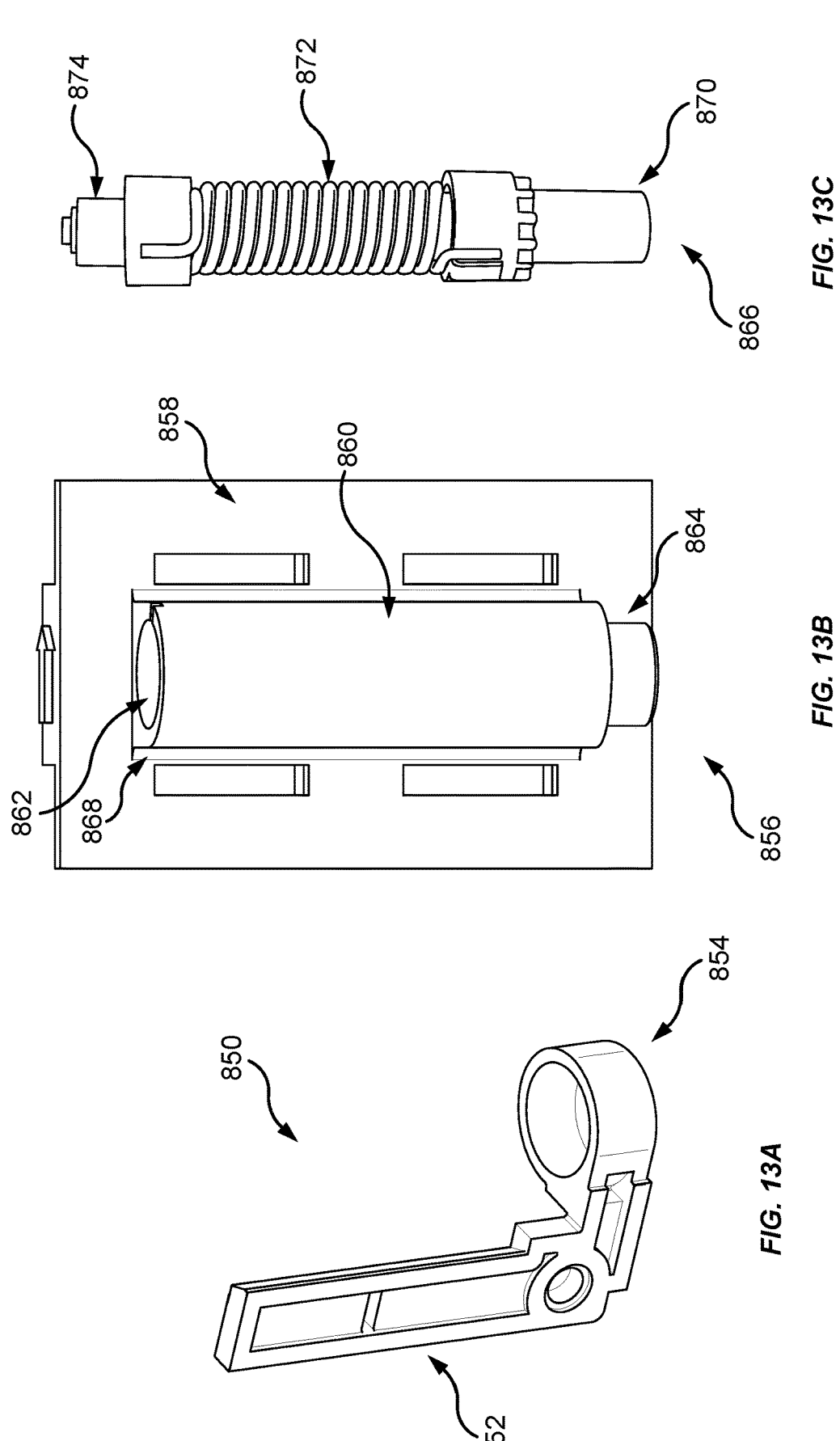
FIGS. 13A-13E present views of components of a gate in accordance with the disclosure.
Figure 13D:
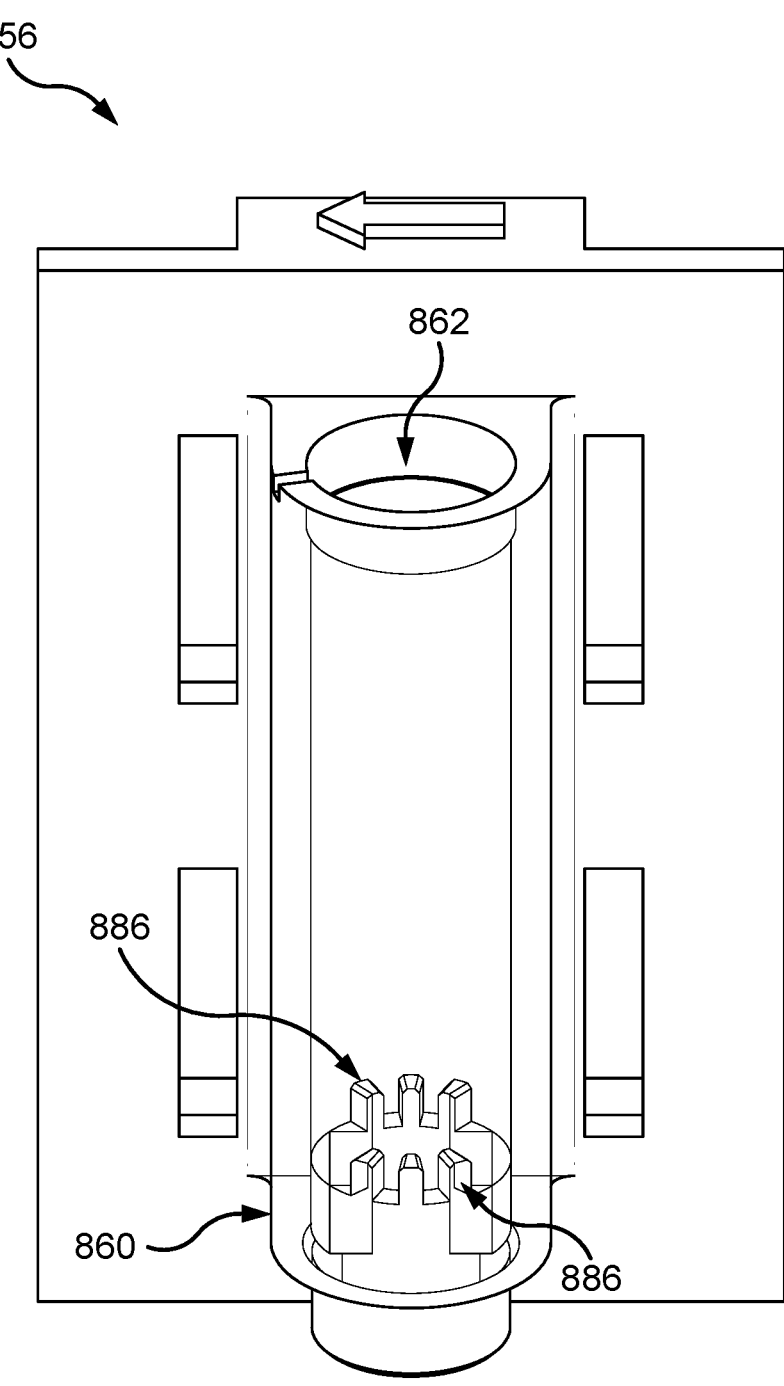

FIGS. 13A-13E provide side views of components of a gate in accordance with one or more embodiments of the disclosure. FIG. 13A depicts return arm 850 of a gate. The return arm 850 may include an extension 852 that may be attached at one end to a ring 854. The axis of symmetry of the ring 854 may be at least approximately, or in some embodiments, strictly, parallel to longest dimension of the extension 852. The return arm 850 may be configured to mate with the first end 864 of the hinge pin housing 860 and to securely fasten to the back of the cleaning pad holder 876. The secure fastening may include clipping or snap-fitting the return arm 850 into the back of the cleaning pad holder 876, though other means of fastening may be used. FIG. 14A depicts return arm 850 with a circular hole 888 and a rectangular hole 890 that may correspond to complementary protrusions from the back of the cleaning pad holder 876, allowing the return arm 850 to clip or snap-fit onto the cleaning pad holder 876. The shape, location, and number of holes and corresponding complementary protrusions may vary to suit different or additional requirements. The return arm 850, when properly disposed in the gate, may ensure the return arm 850, the hinge 856, the hinge pin assembly 866, and the cleaning pad holder 876 hold together.

FIG. 13B depicts a hinge 856 of the gate. The hinge 856 may include an attachment plate 858 that allows the hinge 856 to be secured to a sidewall of a wheel cleaning system. The attachment plate 858 may be fixed to the sidewall removably or irremovably. For example, the attachment plate 858 may slideably attach to a sidewall. Attachment may also be made by fusion, adhesive, such mechanical means as screws, nuts, bolts, pins, snap-fit, and the like. The hinge 856 may also include a hinge pin housing 860 that may formed from the same piece as the attachment plate 858 or fixed to the attachment plate 858. The hinge pin housing 860 may have a generally cylindrically-shaped exterior and a cylindrical hole 862 running lengthwise through the hinge pin housing 860. The hole 862 may be configured to receive a hinge pin assembly. At a first end 864 of the hinge pin housing 860, the outer diameter of the hinge pin housing 860 may be reduced to allow the ring 854 of the return arm 850 to fit over the reduced outer diameter, allowing the return arm 850 to rotate freely. The outer diameter of the ring 854 may be approximately equal to the outer diameter of the hinge pin housing 860. Thus, the ring 854 may only fit over a portion of the hinge pin housing 860.

FIG. 13C depicts a hinge pin assembly 866 that may be configured to be inserted into the hole 862 at a second end 868 of the hinge pin housing 860 opposite the first end 864. A first end 870 of the hinge pin assembly 866 may be inserted into the hole 862 via the second end 868 of the hinge pin housing 860. When fully inserted, the first end 870 of the hinge pin assembly 866 may be rotationally and translationally fixed in place with respect to the attachment plate 858 and the hinge pin housing 860. This fixing may be accomplished by a friction fit (or interference fit) as well as by other suitable means. One example of fixing is with teeth 873 that securely grip the inside surface of the hinge pin housing 860. The fixing may include the teeth 873 of the hinge pin assembly 866 engaging with a complementary set of housing teeth 886 (see FIG. 13D) disposed on the inside wall of the hinge pin housing 860. The plurality of housing teeth 886 may have an inner diameter that is smaller than the inner diameter of hole 862. The housing teeth 886 may be distributed around the full circumference of the hole 862 or may occur in groups. FIG. 13D provides a non-limiting example of two groups of housing teeth 886 separated by regions void of teeth. Alternatively or additionally, at the point of gripping the inside diameter of the hinge pin housing 860 (i.e., the diameter of the hole 862) may be reduced or tapered to ensure that the teeth 873 are fixed while other portions of the hinge pin assembly 866 are able to rotate freely inside hole 862. The hinge pin assembly 866 may include a rigid cylindrical piece, perhaps made of metal, that extends to the first end 870 of the hinge pin assembly 866. A torsion spring 872, disposed over the rigid cylindrical piece, may provide a restoring force to return the gate to a neutral position. One end of the torsion spring 872 may be fixed with respect to the rigid cylindrical piece. The opposite end of the torsion spring 872 may be securely attached to a second end 874 of the hinge pin assembly 866 and may be configured to rotate about the axis of the hinge pin assembly 866. When properly inserted, the second end

874 of the hinge pin assembly 866 may extend beyond the second end 868 of the hinge pin housing 860, allowing the second end 874 of the hinge pin assembly 866 to fixedly connect to the gate, specifically, to the cleaning pad holder. The second end 874 and the cup 877 may be given complementary shapes to allow the second end 874 and the cup 877 (along with the gate 878) to be rotationally fixed with respect to one another. As a non-limiting example, the second end 874 may include one or more flat surfaces in the circumferential direction that would fit securely with the cup 877.

The hinge pin assembly 866 may provide a damping force on the gate when the gate is returning to a neutral (rest or home) position, avoiding rapid deceleration at the very end of the return. Such damping may avoid or minimize releasing dirt, particles, contaminants, and aerosol from the gate as the gate reaches the neutral position.

Figure 13E:
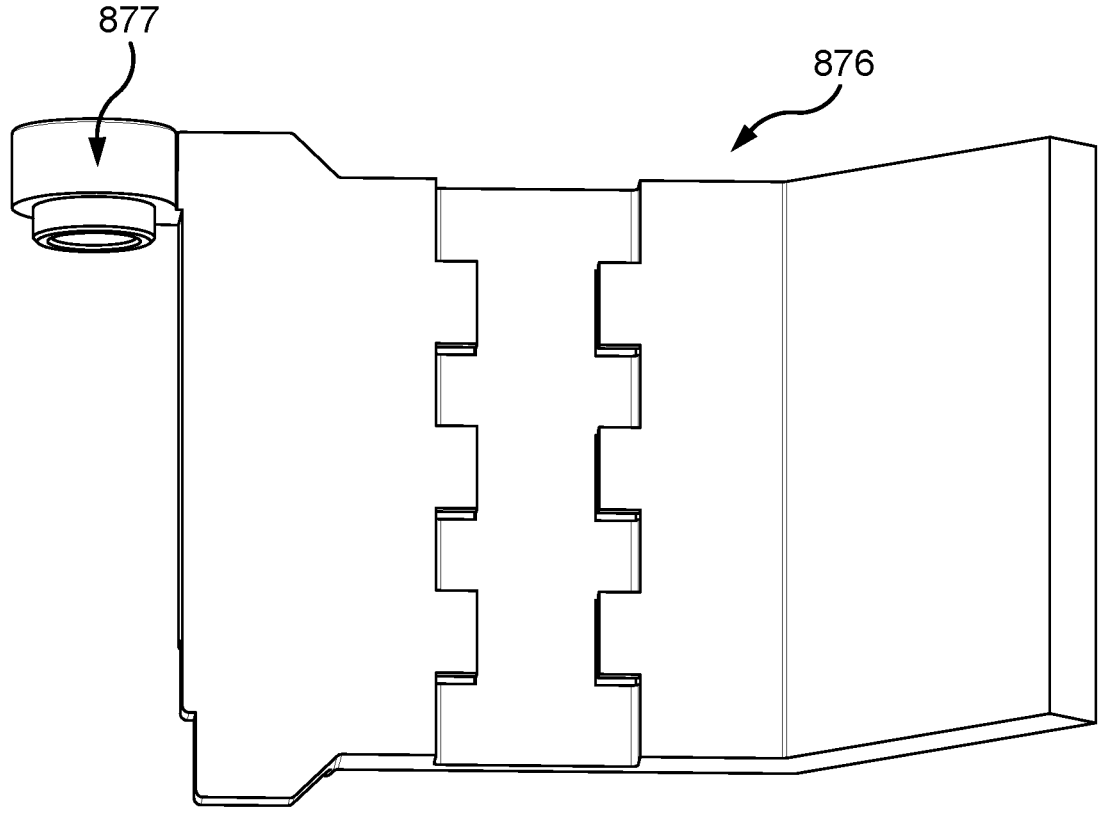
Figure 14A:
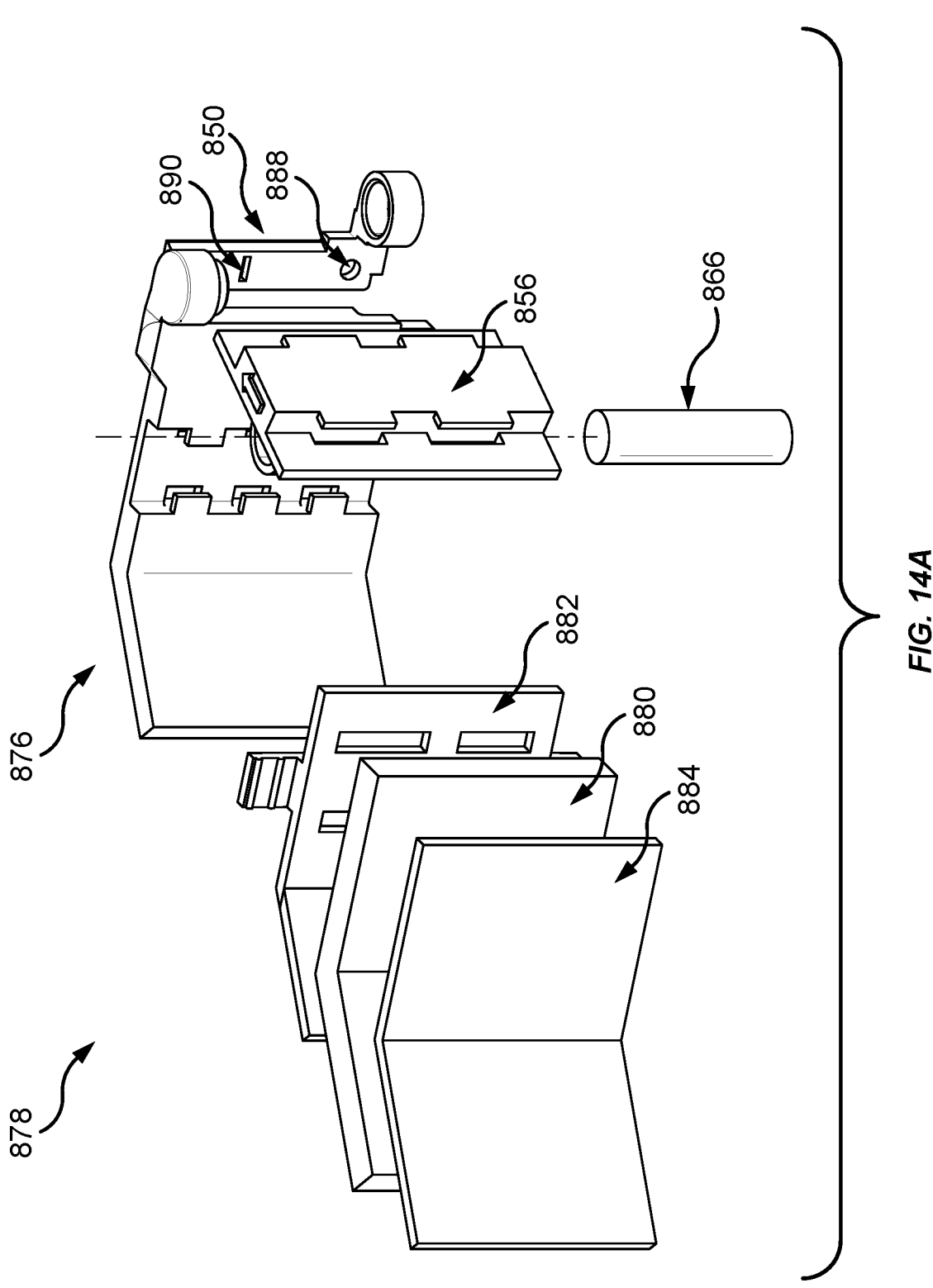
FIGS. 14A-14C present additional views of components of a gate in accordance with the disclosure.

FIG. 13E depicts a cleaning pad holder 876 of the gate according to one or more embodiments of the present disclosure. A cup 877 disposed at an end of the cleaning pad holder 876 is configured to receive and securely hold the second end 874 of the hinge pin assembly 866. Thus, when the clean pad holder 876 rotates away from a neutral position, the torsion spring 872 creates a restoring force that allows the gate to return to the neutral position.

Figure 14B:
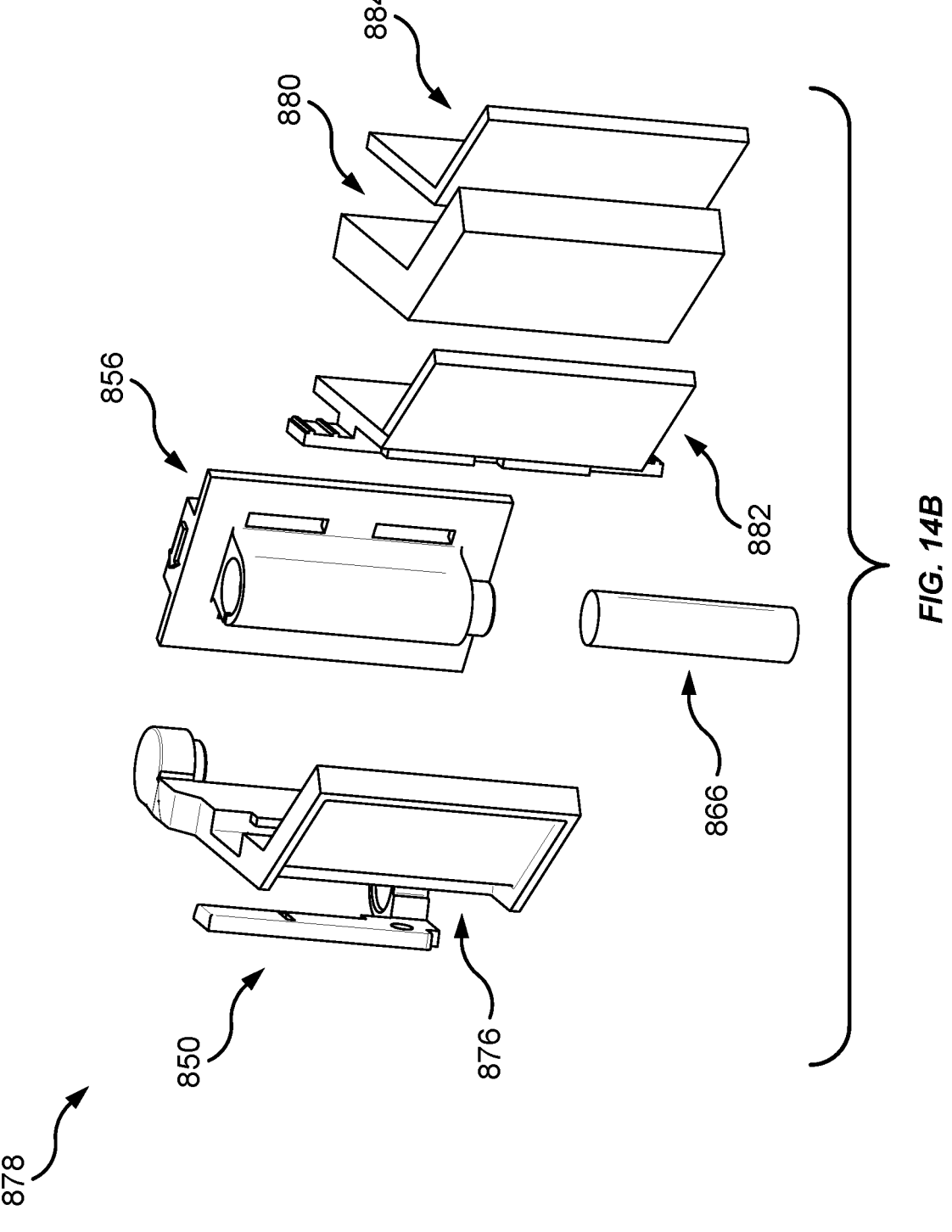
Figure 14C:
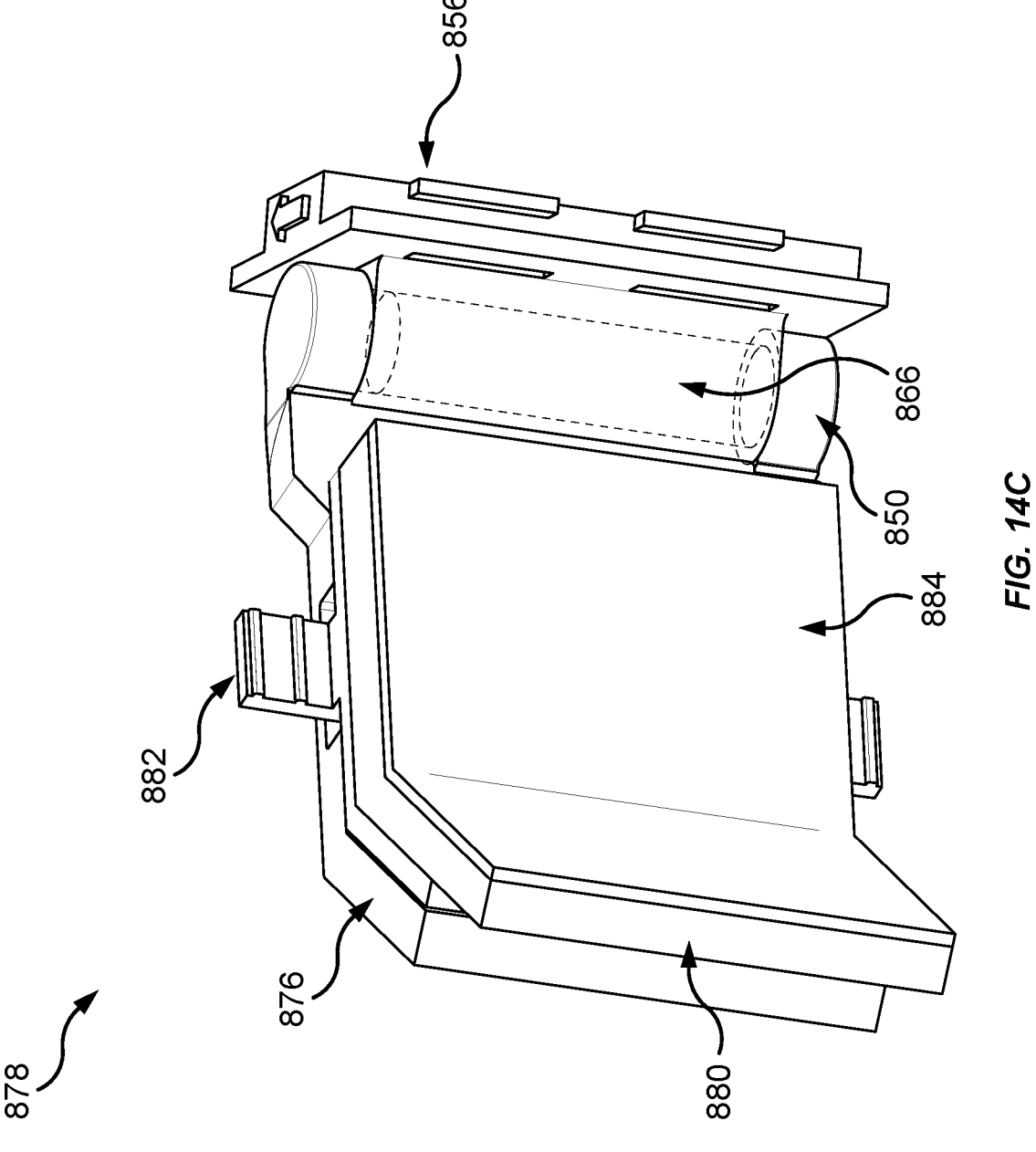

Exploded views of a gate 878 in accordance with the disclosure are presented in FIGS. 14A and 14B. As described previously, the gate 878 may include an absorbent and elastically deformable material 880 securely mounted on a rigid backing 882. A covering material 884 may be attached to the deformable material 880 on the face opposite the rigid backing 882. The gate 878 may be configured to allow the covering material 884 to make contact with a wheel as the wheel is cleaned. The assembly of the covering material 884, the absorbent and elastically deformable material 880, and the rigid backing 882 may be removably connected to and mounted on a cleaning pad holder 876. The cleaning pad holder 876 may be connected via a hinge to an attachment plate 858. A return arm 850 and a hinge pin assembly 866 are similar to those discussed previously. As shown in the embodiment depicted in FIGS. 14A and 14B, the hinge may include FIG. 14C presents a perspective view of the gate 878 of FIGS. 14A and 14B when assembled. Note that the entire unit of gate 878 may be flipped 180 degrees for use on either side of the channel/module.

Figure 15:
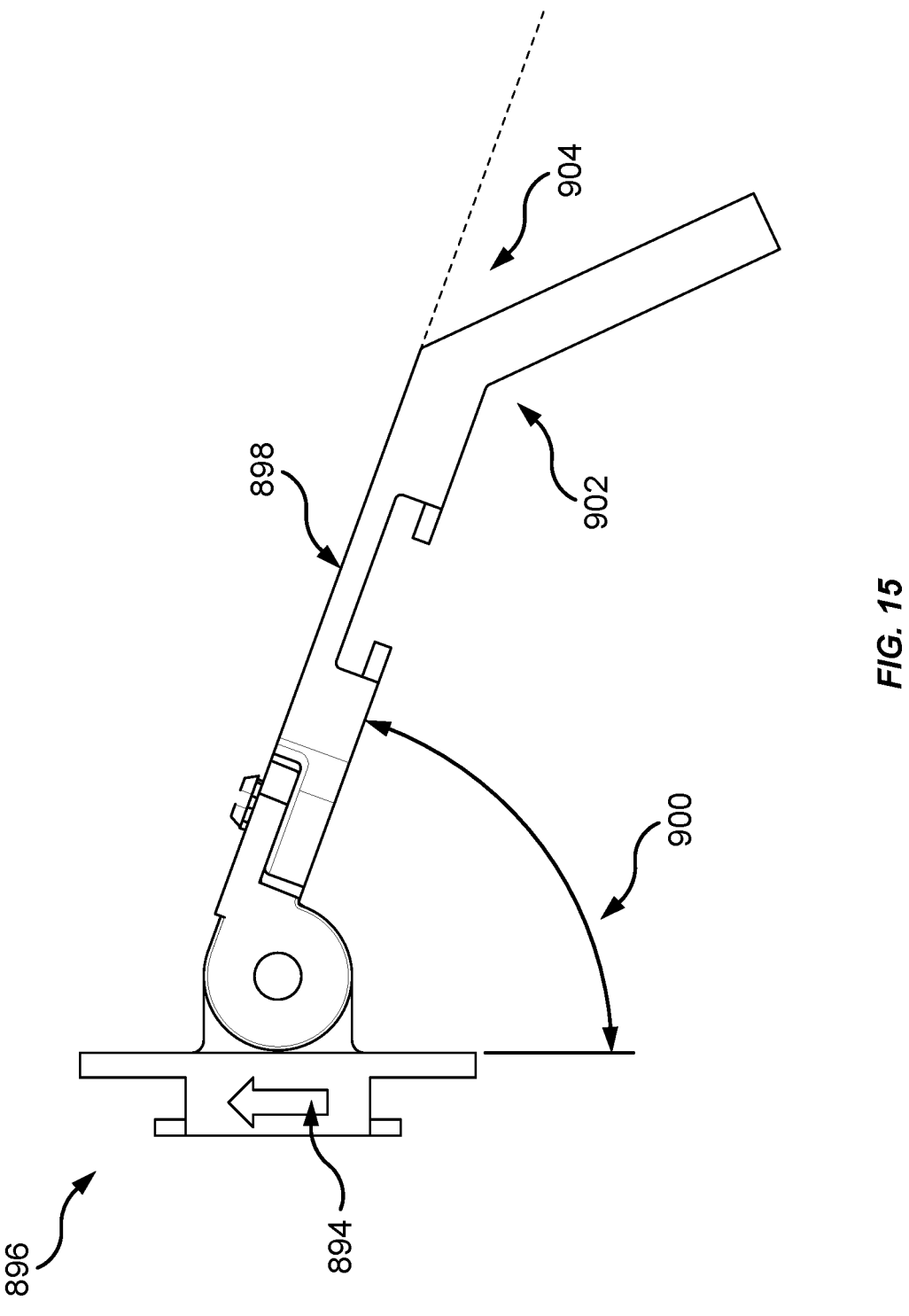
FIG. 15 presents a top view of a gate, identifying angles, in accordance with the disclosure.

A plan view of a gate is presented in FIG. 15. The direction in which a wheel would pass through the gate is shown by the arrow 894 on the attachment plate 896. The gate includes a cleaning pad holder 898 that makes a rest angle 900 with a sidewall. A restoring force in the gate may be configured to return the gate to the rest angle 900 when the gate is not interacting with a wheel. The rest angle 900 may be between 0° and 180°. In one or more embodiments, the rest angle 900 may be between 0° and 90°. It may be preferable for the rest angle 900 to fall in the range of 60° to 80°, even 70°. A rest angle 900 of 70° may be optimal or near optimal because at that angle the first contact of the gate with the front of the wheel (i.e., the part of the wheel that touches the ground during rotation). If the rest angle 900 is too small, the gate may not make contact as the wheel approaches. If the rest angle 900 is too large, the gate may be positioned too far back and may touch the wheel too late, inhibiting the full cleaning process.

Still referring to FIG. 15, the gate may also include a bend 902 at a bend angle 904. The bend angle 904 measures the forward angle of the end of the cleaning pad holder 898 farthest from the hinge. The bend angle may be between 0° and 90°. In one or more embodiments, the bend angle may be between 30° and 60°, even 45°. The bend in the gate may be a continuous curve over a portion or all of the gate rather than a distinct break at a single location on the gate. The bend angle 904 may be optimized to continue cleaning the bottom of the wheel as the wheel passes through the gate, mimicking how the wheel would be cleaned by hand. As the wheel continues to pass through the gate, the bottom surface of the wheel may no longer contact bend 902, bend angle 904 may then provide a cleaning/scraping of the side of the wheel as the wheel moves through the gate.

Figure 16A:
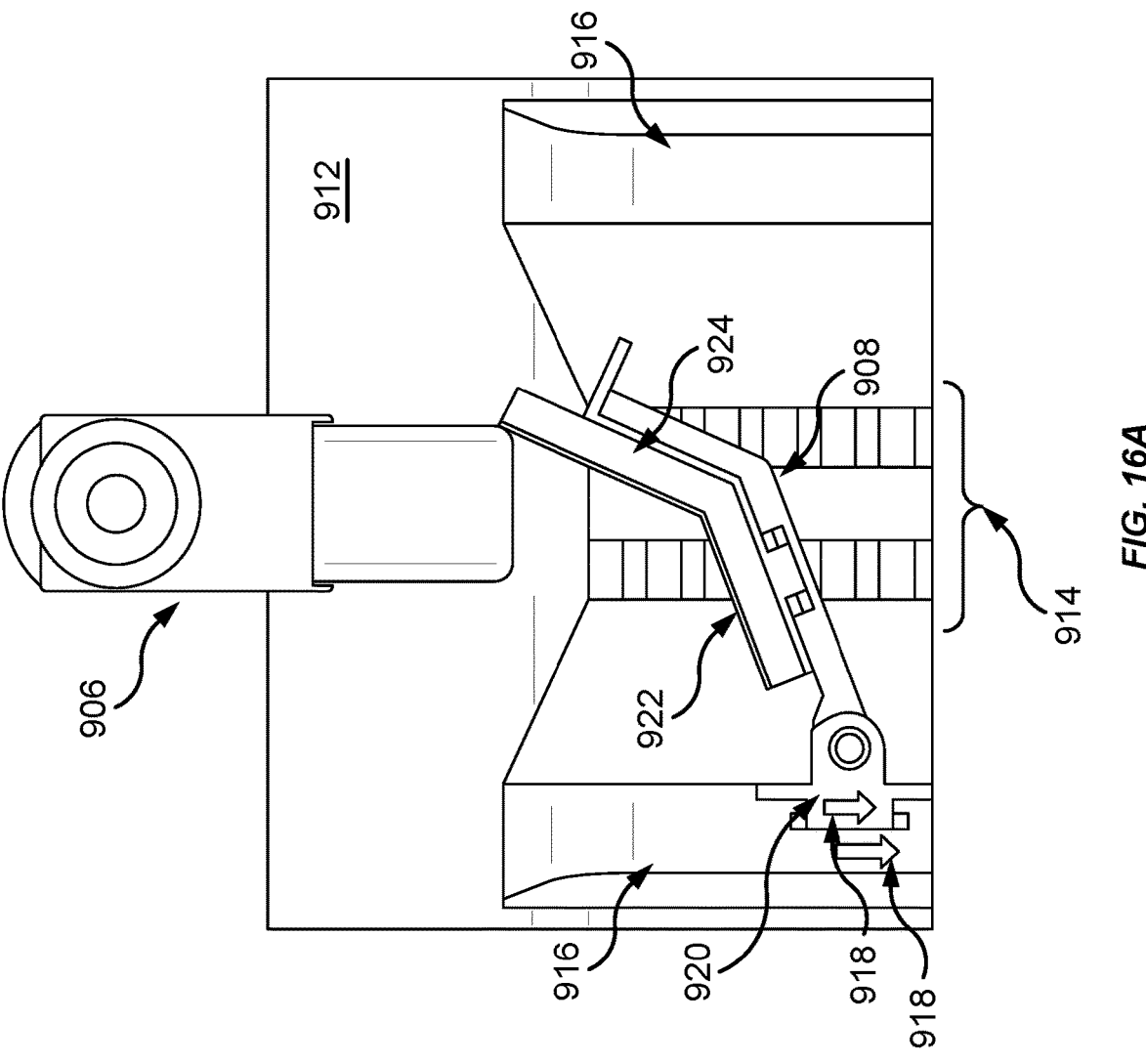
Figure 16B:
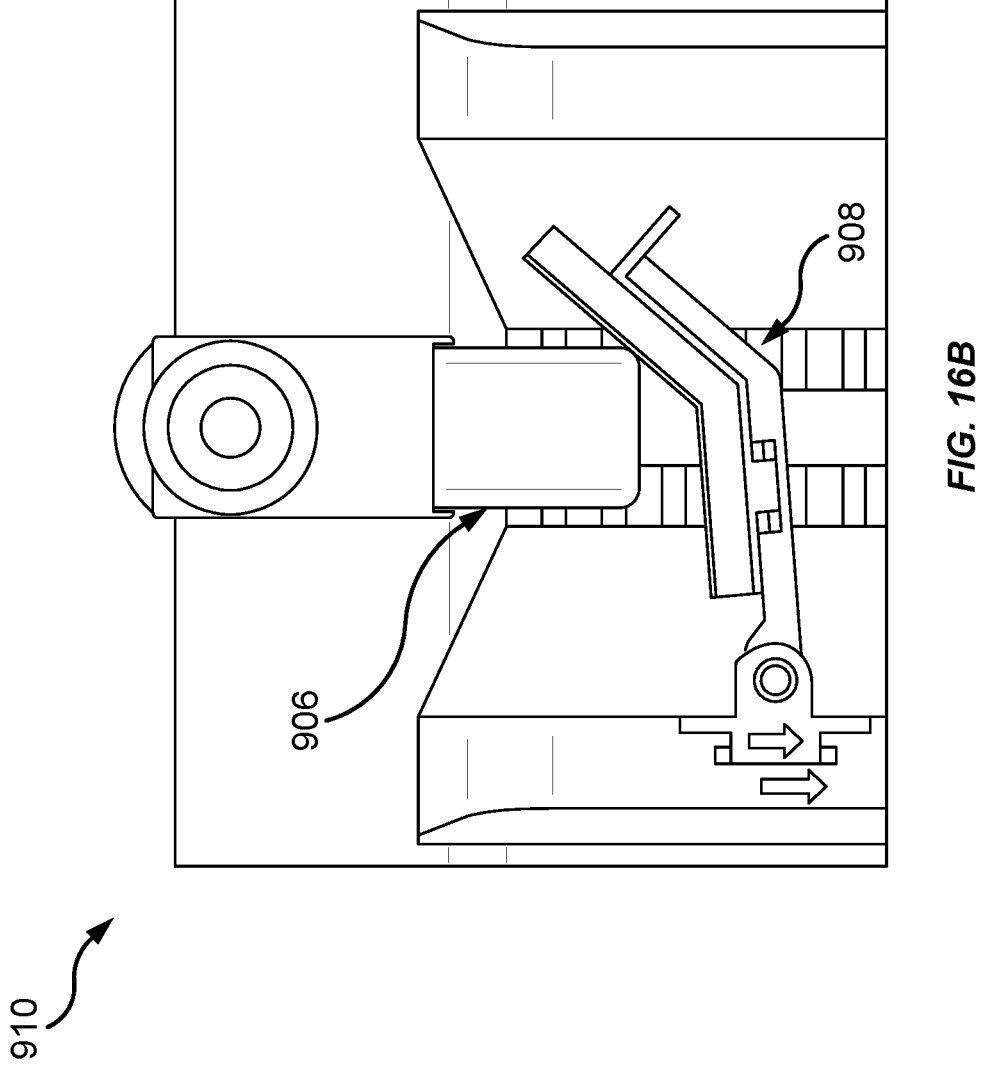

FIGS. 16A-16C provide a series of plan views of a wheel 906 passing through a gate 908 of the disclosed wheel cleaning system 910. The wheel cleaning system 910, may include an entry ramp 912, a channel 914 through which the wheel 906 may pass, and a pair of sidewalls 916 disposed on opposite sides of the channel 914. The channel 914 may include grooves, ridges, or other forms of textured surface that may facilitate the wheel 906 rotating while traversing the channel 914 rather than sliding. Aligned arrows 918 may be molded or printed on both a sidewall 916 and an attachment plate 920 of the gate 908. The alignment of these arrows 918 ensures that the gate 908 is properly installed in the wheel cleaning system 910. The direction of the arrows 918 may also indicate the direction of passage for the wheel 906.

In FIG. 16A, a wheel 906 is depicted just entering the wheel cleaning system 910 and making initial contact with the covering material 922 of the gate 908 and beginning to deform the absorbent and elastically deformable material 924. Initial contact of the gate 908 with the wheel 906 may be with a portion of gate 908 distal from the hinge.

At as time subsequent to that illustrated in FIG. 16A, the wheel 906 has advanced in the channel while the gate 908 has rotated as seen in FIG. 16B. Note that the portion of the gate 908 in contact with the wheel 906 has moved closer to the hinge.

FIG. 16C depicts yet a later time when the gate 908 has continued to rotate in a clockwise direction as viewed from above. In this scene, the rolling surface of the wheel 906 is being cleaned as well as the edge opposite the first edge to be cleaned.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for cleaning wheels, the system comprising:
a first module comprising:
    a first bottom comprising:
        a first channel extending in a downstream direction and configured to receive a wheel;
        an entry ramp disposed at an upstream end of the first channel; and
        a first exit ramp disposed at a downstream end of the first channel;
    a pair of first sidewalls disposed on opposite sides of the first bottom, each sidewall extending up from the first bottom; and
    a plurality of gates disposed in an alternating fashion on opposite sidewalls of the pair of first sidewalls along the first channel with a separation sufficient to avoid interference between gates and configured to rotate over the first channel, each gate comprising:
        a cleaning pad holder;
        a cleaning pad configured to be fastened to the cleaning pad holder;
        an attachment plate fastened to a respective sidewall;
        a hinge pin that rotatably connects the cleaning pad holder to the attachment plate; and
        a return spring configured to apply a restoring force on the gate to restore the gate to a rest position when the gate is displaced from the rest position.

2. The system of claim 1, further comprising:
at least one extension module configured to extend the system by mating with the downstream end of a previous module, the previous module comprising either the first module or another extension module, each extension module comprising:
    an extension bottom configured to continue the first bottom without a difference in a cross-sectional profile;
    a pair of extension sidewalls configured to continue the pair of first sidewalls without a difference in the cross-sectional profile;
    at least one additional gate of the plurality of gates;
    a rampless upstream end that complements the exit ramp of the previous module such that a continuous channel is formed by the system; and an extension exit ramp of the same form as the first exit ramp.

3. The system of claim 1, wherein:

the cleaning pad extends across the entire first channel as the gate rotates.

4. The system of claim 1, wherein the cleaning pad holder comprises a bend toward the upstream direction.

5. The system of claim 1, wherein the return spring comprises a first arm operably connected to the cleaning pad holder and a second arm operably connected to the attachment plate.

6. The system of claim 5, wherein the return spring is wound around the hinge pin.

7. The system of claim 6, wherein the return spring is associated with a return mechanism that further comprises:

a hinge pin assembly that includes the return spring and the hinge pin; and a hinge pin housing that includes or is fixed with respect to the attachment plate and that includes a hole configured to receive the hinge pin assembly and to securely fasten to a first portion of the hinge pin assembly while allowing a second portion of the hinge assembly to rotate in the hole.

8. The system of claim 5, wherein each gate further comprises a damping mechanism that provides a second force that opposes a return force over a final portion of the return of the gate to the rest position.

9. The system of claim 8, wherein the damping mechanism comprises at least one damping spring, the damping spring disposed on the attachment plate and contacting the gate over the final portion of the return to decelerate the gate.

10. The system of claim 1, wherein the system is deliverable as a plurality of parts entirely unassembled, partially assembled, or fully assembled.

11. The system of claim 1, wherein the first bottom and the first pair of sidewalls comprise a single piece.

12. The system of claim 2, wherein:

the downstream end of the first module and of each extension module are identical, the upstream end of each extension module is configured to mate with the downstream end of the previous module, and the mating comprises at least one of adhesive, interlocking pieces, hook and loop fasteners, a nut, a bolt, or a screw.

13. The system of claim 12, wherein the mating comprises interlocking pieces, the interlocking pieces comprising a snap-fit and/or a pin and a matching hole, the pin and the hole each formed in the respective mating modules.

14. The system of claim 2, further comprising an identification subsystem that comprises at least one identifier for each module that attaches to the first module and each extension module in the system to distinguish the modules of the system, each identifier comprising at least one of a color, at least one alphanumeric character, or a nonfunctional shape.

15. The system of claim 14, wherein the identifier attaches to at least one sidewall of each module of the system by snap-fit.

* * * * *